United States Patent [19]

Callais et al.

[11] 3,885,089

[45] May 20, 1975

[54] TELEVISION SCRAMBLING SYSTEM

[75] Inventors: Richard T. Callais, Northridge; D. Paul Warther, Playa Del Rey, both of Calif.

[73] Assignee: Hughes Aircraft Company, Culver City, Calif.

[22] Filed: Feb. 16, 1973

[21] Appl. No.: 333,231

[52] U.S. Cl. ............. 178/5.1; 325/34; 178/DIG. 13
[51] Int. Cl. ............................................. H04n 1/44
[58] Field of Search ......................... 178/5.1; 325/34

[56] References Cited

UNITED STATES PATENTS

| | | | |
|---|---|---|---|
| 3,054,857 | 9/1962 | Weiss | 178/5.1 |
| 3,733,431 | 5/1973 | Kirk, Jr. et al. | 178/5.1 |
| 3,789,131 | 1/1974 | Harney | 178/5.1 |

*Primary Examiner*—T. H. Tubbesing
*Assistant Examiner*—S. C. Buczinski
*Attorney, Agent, or Firm*—W. H. MacAllister, Jr.; W. L. Androlia

[57] ABSTRACT

A subscription television scrambling and unscrambling system. In one embodiment, at the transmitter end of the system, first means selectively alternates or scrambles at least two television programs between at least two television channels at preselected times. At or before each of the preselected times second means transmits an associated coded message to subscribers in the system. At each subscription receiver site third means is responsive to each coded message and to a subscriber input for generating a first signal when the subscriber is authorized to receive an unscrambled one of the scrambled television programs. A fourth means at each site is responsive to the scrambled television channels, the first signal and each coded message for selectively alternating or scrambling the previously alternated or scrambled television programs between the scrambled television channels to permit the unscrambled reception of the television program selected by the authorized subscriber.

12 Claims, 27 Drawing Figures

TELEVISION SCRAMBLING SYSTEM

BACKGROUND OF THE INVENTION

1. Field of the Invention

This invention relates to subscription television systems and particularly to a system for transmitting scrambled television programs which are unintelligible, or distorted to the degree that the program content is significantly different and objectionable compared to standard television reception, to all television receivers except those having ancillary unscrambling equipment capable of making the program intelligible or normal when properly authorized.

2. Description of the Prior Art

Many different types of subscription television scrambling systems have been proposed for transmitting scrambled television programs which can only be unscrambled by subscribers who either pay or are willing to pay the fee demanded for intelligible reception of the desired television programs. Some representative types of scrambling systems are described in the following paragraphs.

U.S. Pat. No. 3,684,823 illustrates a cable television system which may be used for subscription television programs. In this system a low frequency audio pay TV control signal is modulated onto a carrier and sent over the cable along with video and audio TV program information. At any given subscriber receiver the carrier of the control signal is removed, and the audio control signal is used to actuate a control circuit which applies a disabling signal to an IF portion of the receiver under control of the control circuit. This results in a strong beat interference being sent to the picture tube of the subscriber. A subscriber, wishing to view the scrambled subscription TV program, must manually switch out the disabling signal and also activate a timing device to record the subscription viewing time.

In the subscription television scramble system of U.S. Pat. No. 3,242,258, the transmitter includes a circuit for simultaneously transmitting an audio signal of a frequency within the audible frequency range synchronized with the video signal. A transmitter encoder suppresses the horizontal synchronizing signals and replaces them with a key signal so as to distort the video signal transmitted by the transmitter. The transmitter encoder further distorts the video signals transmitted by the transmitter by including a phase shifting circuit for phase shifting the electrical phase of the video signal before transmission. A receiver receives and reproduces the video signal and the key signal, and also reproduces the audio signal in synchronism with the video signal. a receiver decoder reconstitutes the horizontal synchronizing signals from the received key signal so as to nullify the effect of the transmitter encoder and provide in the receiver a video signal including the horizontal synchronizing signals. The receiver decoder further includes a receiver phase shifting circuit for shifting the electrical phase of the received video signal so as to nullify the effect of the transmitter phase shifting circuit.

Another suggested subscription television system is described in U.S. Pat. No. 3,478,166. In this system a transmitter produces composite video signals with the sync component reduced in amplitude to the grey level. The transmitter also produces program audio and barker audio signals. Sync signal augmenting pulses are generated in two modes, one true and one false, which are randomly interchangeably transmitted over two transmission channels as determined by a control signal, which is transmitted to enable decoding. At a receiver end of the system an attachment enables an ordinary television receiver, by use of the control signal, to select the proper channel for true augmenting pulses which restor the grey level sync pulses to their normal amplitude. Barker audio is provided to the television receiver until the program is properly decoded.

In other suggested subscription television systems a television signal is distributed in coded form for use only in subscriber receivers having appropriate decoding apparatus actuated in accordance with the coding schedule of the telecast. U.S. Pat. Nos. 2,510,046 and 2,547,598 are examples of this type of system. In this type of system coding is accomplished by altering some characteristic of the television signal during spaced intervals which may have a duration corresponding to several field-trace intervals and which may have a time separation also corresponding to one or more field-trace intervals.

A further subscription television scrambler system is described in U.S. Pat. No. 3,238,297. In this scrambler system a coder unit at the transmitter end of the system is used to affect, for example, a reversal in the polarity of either the video or sound signals, or both, or other abnormal switching or operation of a subscription TV program being transmitted on a channel. This results in the transmission of, for example, an image which cannot be received by a conventional TV receiver or an image which is so distorted or jittered that it cannot be viewed normally. Each subscriber in the system is furnished with a receiver coder unit. Each coder unit at the transmitter and at each subscriber's receiver is provided with adjustable devices, such as switches, which need to be set for each TV program in order to have the coder unit produce a selected scanning code which is being produced by the transmitter coder unit. When a subscriber wishes to receive a program, he communicates with the transmitting station by telephone, by mail, or in any desirable manner, in order to obtain a key code or switch setting combination which is individual to his receiver for the specific program he desires. This key code or switch setting combination advises him how to set the switches on his coder unit. When the subscriber so sets the switches on his coder unit, his coder unit will produce the same scanning code as that produced at the transmitting station. The subscriber's receiver will then be in phase with the transmitter and will properly reproduce an undistorted image of the desired program on a selected TV channel.

In general, prior art scrambling systems require modification of the sound and/or video TV signals to achieve the scrambling effect. Upon unscrambling or decoding the specific change or degradation to the TV signals must be removed or missing signal components added to restore the TV signal to as much of its original quality as possible. This process generally tends to degrade the signal quality in various ways, and generally adds additional complexity to the unscrambling equipment.

More specifically, the above types of suggested subscription television scrambler systems basically achieve the scrambling effect on the transmission by: injecting interference into the subscriber's picture tube; suppressing the horizontal sync pulses and phase shifting the video signals; reducing the amplitude of the sync component of the composite video signals to the grey level and generating various control and signal pulses, as well as program and barker audio signals; reversing the polarity of the program video or sound; or altering some characteristic of the television signal during spaced intervals.

In all of the above types of scrambling systems, the scrambling involves only the one television program on the transmission channel to be scrambled. None of the above types produces its scrambling effect by sequentially switching at least two television programs between at least two associated television transmission channels at a desired preselected rate.

Accordingly, it is an object of this invention to provide a novel scrambling system for a subscription television system.

Another object of this invention is to provide a scrambling system which does not substantially degrade the signal in any way perceptible to the viewer, but allows the display of the unscrambled signal at substantially its prescrambled quality level.

Another object of this invention is to provide a scrambling system which is basically very simple, and requires a minimum of complexity and cost at the subscriber set where it is economically more desirable to have these advantages.

Another object of this invention is to provide a scrambling system wherein the scrambling is basically accomplished by intermittently switching two television programs back and forth between two television program transmitters.

Another object of this invention is to provide a scrambling system wherein a plurality of television programs can be intermittently switched among a plurality of transmission channels to provide a plurality of output scrambled television programs.

Another object of this invention is to provide a scrambling system wherein the program video and sound from a first source can be switched at the baseband frequencies with the program video and sound from a second source.

Another object of this invention is to provide a scrambling system wherein two television programs can be scrambled by intermittently switching their intermediate frequencies between two television program transmitters.

Another object of this invention is to provide a scrambling system wherein two television programs can be scrambled by intermittently switching them at their radio frequencies.

Another object of this invention is to provide means at each subscriber terminal for unscrambling a selected scrambled program when authorized to do so.

Another object of this invention is to provide a basic scrambling system which lends itself to the addition of scrambled pay TV channels beyond the pair herein described, by the use of relatively small additional circuitry.

Another object of this invention is to provide a scrambling system wherein any of a number of commonly used techniques such as cards, tickets, keyboards, key switches, and direct authorization by the seller over a coded channel can be used in different versions or configurations of the invention.

A further object of this invention is to provide a scrambling subscription cable television system which is compatible with either one-way transmission or two-way transmission between the head end and remote subscribers.

SUMMARY OF THE INVENTION

Briefly, applicants have provided a novel system for scrambling at least two television programs at a transmitter end of the system and for allowing an authorized subscriber to unscramble a selected one of the scrambled television programs. In a basic embodiment two television programs are intermittently and selectively switched between two transmission channels so that the output of either transmission channel comprises a sequence of alternate television signals from the two television programs. At a receiver end of the system a first means is provided for allowing an authorized subscriber to view a selected program by switching between the input transmission channels at substantially the same time that the programs are switched between the transmission channels. Second means is provided for transmitting a coded message from the transmitter end to the subscribers to indicate the switching times.

BRIEF DESCRIPTION OF THE DRAWINGS

These and other objects, features and advantages of the invention, as well as the invention itself, will become more apparent to those skilled in the art in the light of the following detailed description taken in consideration with the accompanying drawings wherein like reference numerals indicate like or corresponding parts throughout the several views and wherein.

DESCRIPTION OF THE PREFERRED EMBODIMENTS

Figure 1:
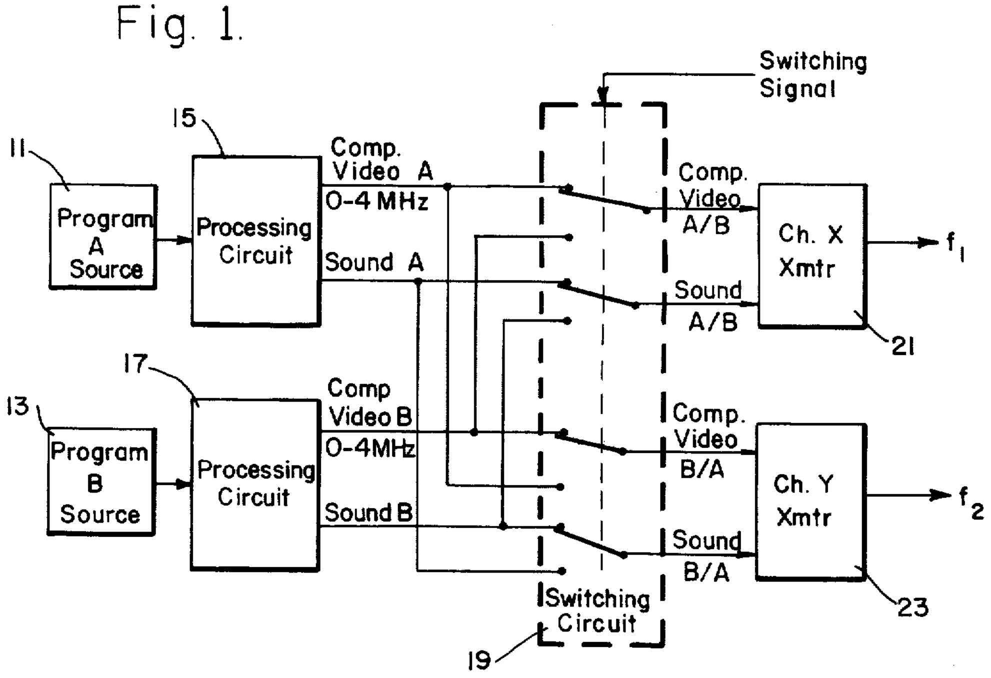
FIGS. 1, 2 and 3 illustrate three different embodiments wherein scrambling in conformance with the invention may be accomplished at the transmitter end of the television scrambling system.
Figure 2:
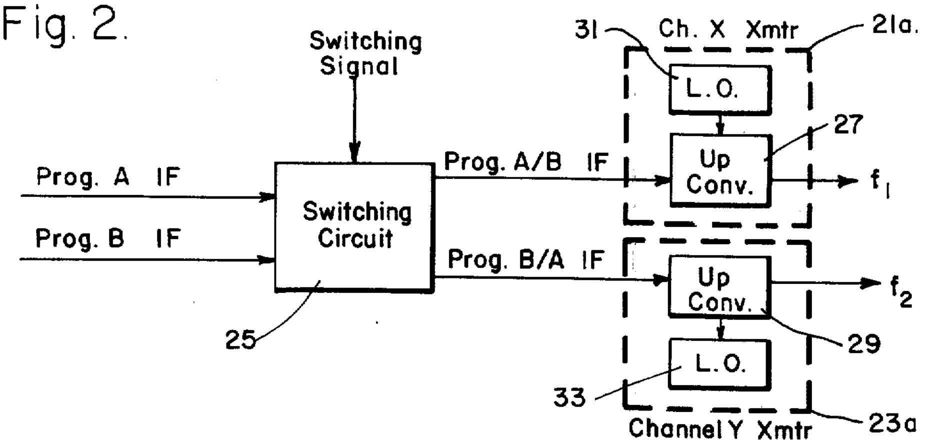
Figure 3:
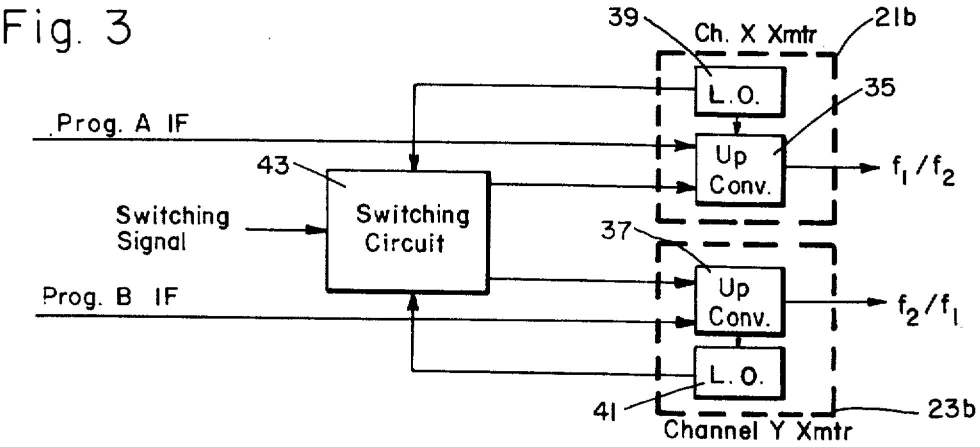
Figure 4:
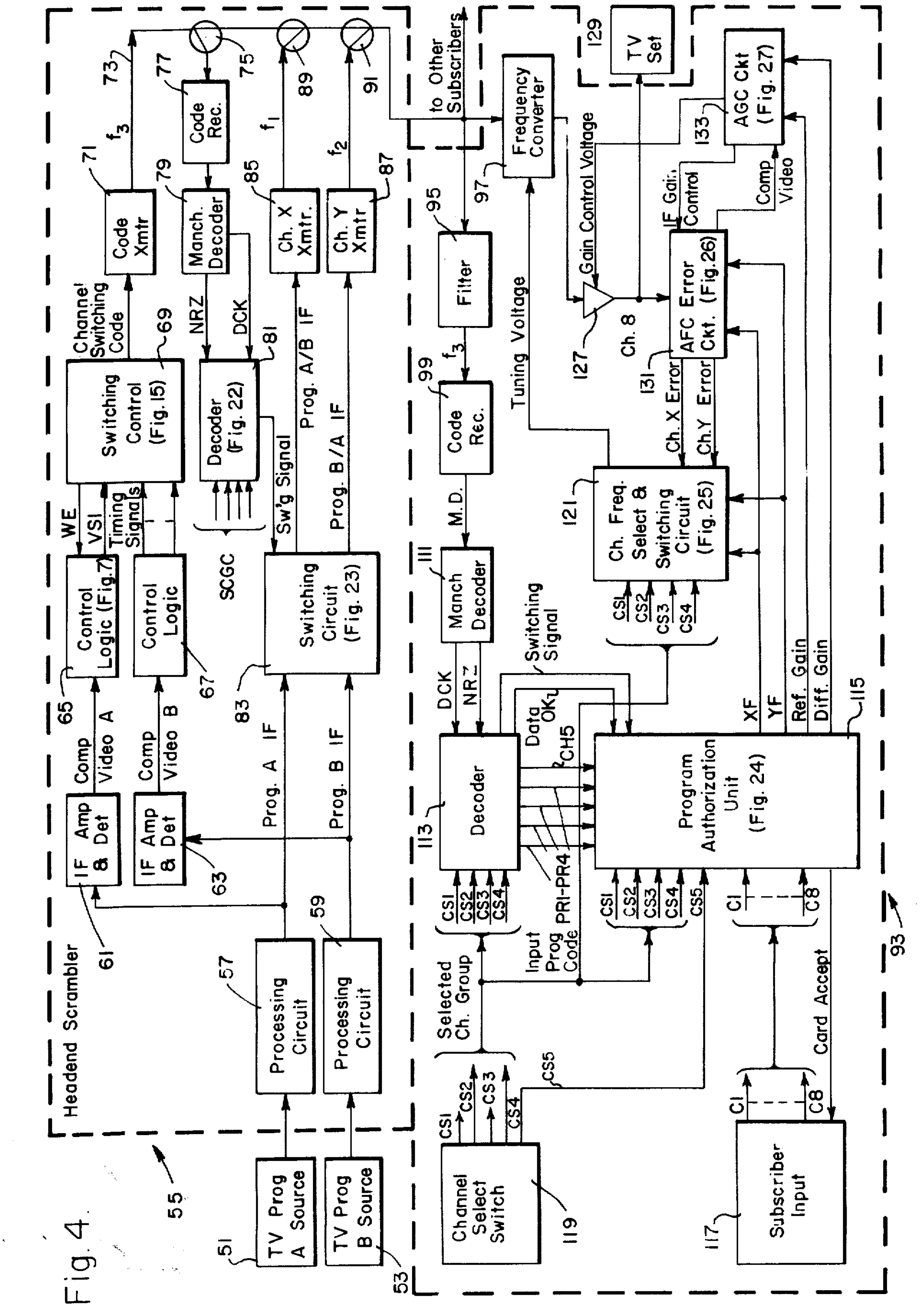
FIG. 4 illustrates a block diagram of a subscription television network which incorporates one embodiment of the invention.

Referring now to the drawings, FIGS. 1, 2 and 3 respectively illustrate three different embodiments for scrambling television programs A and B at the transmitter end of a television network. While each of these embodiments can be utilized in various forms of television transmission and receiption, including over-the-air TV broadcasts, cable television (CATV) or closed circuit television, all further discussions of the invention will pertain to an exemplary CATV system. In these three embodiments it will be shown that the programs A and B can be switched (scrambled) at their baseband frequencies, intermediate frequencies or radio frequencies. Also included in this invention, as will be described in relation to FIG. 4, are means which enable the audience (subscribers) receiving the television transmissions to be authorized, individually or in groups, to view and listen to the selected unscrambled television program.

In FIG. 1 programs A and B are applied from program sources 11 and 13 to processing circuits 15 and 17, respectively, to enable each of the processing circuits 15 and 17 to develop its corresponding baseband composite video (0 to about 4 mHz) and sound outputs. If either of the program sources 11 and 13 is a local origination studio, the associated processing circuit just amplifies the sound and composite video signals separately. Where a program source is either a TV antenna or a cable for receiving the program information, the associated processing circuit would develop its composite video and sound outputs by demodulating or otherwise processing the composite radio frequency TV signals containing the modulated video carrier, color carrier and sound carrier.

Figure 23:
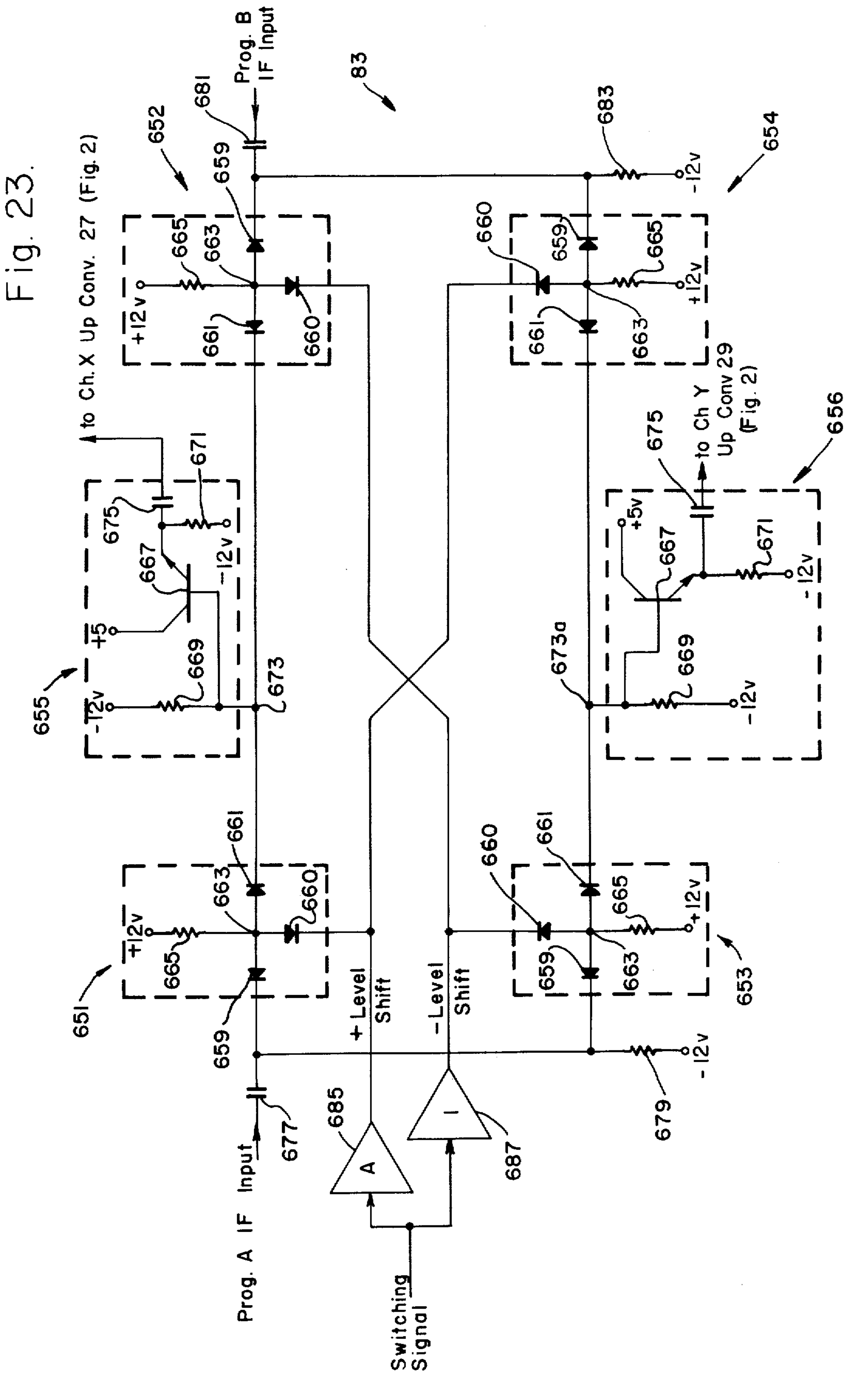
FIG. 23 illustrates a block diagram of the switching circuit of FIG. 4.

The baseband sound and video signals from each of the processing circuits 15 and 17 are applied to a switching circuit 19 where they are simultaneously and individually switched each time that a switching signal (to be explained later) is applied. The schematic representation of the switching circuit 19 can be readily implementable with electronic or other switches available within the present state-of-the-art. One example of an electronic switch is shown in FIG. 23.

At a first switching time, program A video and sound signals from the switching circuit 19 are modulated onto their respective carriers in a channel X transmitter 21. At the same first switching time, program B video and sound signals from the switching circuit 19 are modulated onto their respective carriers in a channel Y transmitter 23. At a second switching time, the program A signals are switched to the channel Y transmitter 23, while the program B signals are switched to the channel X transmitter 21. At each subsequent switching time the program A and B signals are respectively switched by the switching circuit 19 into the opposite ones of the transmitters 21 and 23.

The output transmission signal characteristics of the channel X and Y transmitters 21 and 23 are normal television signals at video carrier frequencies of $f_1$ and $f_2$, except for the alternately switched sources of TV programming. The outputs of the channel X and Y transmitters 21 and 23 will henceforth be designated as $f_1$ and $f_2$, respectively. However, it should be understood that the $f_1$ and $f_2$ outputs represent television channel spectrums containing sound and color carriers (as required) and video carrier frequencies of $f_1$ and $f_2$. The $f_1$ and $f_2$ outputs are frequency multiplexed onto a main trunk line (not shown) for transmission downstream to CATV subscribers. In the case of over-the-air TV broadcasts or closed circuit television, the transmitted output signals $f_1$ and $f_2$ would be transmitted in the normal manner utilized for such transmissions.

FIG. 2 discloses an embodiment for switching (scrambling) the program A and B signals at their intermediate frequencies (IFs). More specifically, the program A and program B IF signals, each containing its associated composite video, sound and color information, are applied to a switching circuit 25, similar to that shown in FIG. 23. The switching circuit 25 develops program A/B and program B/A IF output signals which are respectively applied to an upconverter 27 in a channel X transmitter 21*a* and an upconverter 29 in a channel Y transmitter 23*a*. The upconverter 27 heterodynes the program A/B IF with the output of a local oscillator 31, also contained in the transmitter 21*a*, to develop the channel X output $f_1$. At the same time, the upconverter 29 heterodynes the program B/A IF with the output of a local oscillator 33, also contained in the transmitter 23*a*, to develop the channel Y output $f_2$.

Upon each application of a switching signal to the switching circuit 25, the program A and program B IF signals are alternately switched between the upconverters 27 and 29, respectively. By this means, when the program A IF is being applied to the channel X transmitter 21*a*, the program B IF is being applied to the channel Y transmitter 23*a*, and vice versa.

The embodiment of FIG. 2 could also be modified to enable the sound IF and composite video IF signals of each program to be switched separately and then combined and upconverted in a transmitter in a manner similar to that shown in FIG. 1.

FIG. 3 illustrates a modification of the embodiment of FIG. 2 to obtain the third embodiment wherein the switching (scrambling) of the program A and B signals occurs at the radio frequencies. In this embodiment the program A and B IF signals are respectively applied directly to an upconverter 35 in a channel X transmitter 21*b* and an upconverter 37 in a channel Y transmitter 23*b*. The outputs of local oscillators 39 and 41, respectively located in the transmitters 21*b* and 23*b*, are applied to a switching circuit 43, similar to that shown in FIG. 23, and selectively switched between the upconverters 35 and 37 at each switching signal time. The switching or scrambling in this embodiment, therefore, involves the changing of the frequencies of the upconverters 35 and 37 at each switching signal time. In this manner, at each switching signal time, the output channel frequency of the channel X transmitter 21*b* is either changed from $f_1$ to $f_2$ or from $f_2$ to $f_1$, while at the same time the output channel frequency of the channel Y transmitter 23$b$ is either changed from $f_2$ to $f_1$ or from $f_1$ to $f_2$, respectively. As a result, whenever program A is transmitted at the channel X output frequency $f_1$, program B is transmitted at the channel Y output frequency $f_2$, and vice versa.

While the basic scrambling technique has been explained in relation to the three embodiments of FIGS. 1, 2 and 3, the mechanization illustrated in FIG. 4 for unscrambling a scrambled TV channel is compatible with all three scrambling embodiments. A more detailed explanation of the invention in an overall television scrambling and unscrambling system will now be given, utilizing the scrambling embodiment of FIG. 2, by referring to FIG. 4.

FIG. 4 illustrates a cable television network which incorporates the invention. TV programs A and B are applied from sources 51 and 53 to a headend scrambler 55, located within a headend site (not shown), for processing and subsequent scrambled transmissions. More particularly, programs A and B are applied to processing circuits 57 and 59. These processing circuits 57 and 59 convert the input program signals to program A and program B IF signals, respectively. If, for example, the source 51 were a local origination studio, the program video and sound would be modulated in two separate modulators (not shown), respectively, with the resultant program video IF and program sound IF signals being combined in an IF filter, not shown, to develop the program IF signal. If, for example, the source 51 were either a TV antenna or a cable for receiving the program information, the processing circuit 27 would downconvert the program RF into the desired program IF. It should be understood that the above discussion applies equally to the source 53 and processing circuit 59.

The program A IF and program B IF signals are applied to IF amplifier and detector 61 and IF amplifier and detector 63, respectively. The detectors 61 and 63, respectively, develop composite video A and composite video B signals which are applied to control logic circuits 65 and 67 respectively. The control logic circuits 65 and 67 are similar in structure and operation. However, different signals are utilized from each of the circuits 65 and 67. The function of the control logic circuit 65 is to develop a vertical sync interval (VSI) signal which indicates a preselected period within the vertical blanking interval of the composite video A. On the other hand, the control logic circuit 67 is utilized for the development of timing signals which disclose the exact location within any horizontal line and identifies that line in the composite video B. The VSI signal from control logic 65, as well as the timing signals from the control logic 67, are applied to a switching control 69. The switching control 69 utilizes the inputs from the control logic circuits 65 and 67 to decide when to switch and the rate of switching. In addition, the switching control 69 terminates the VSI signal by applying a WE (window end) signal to the control logic 65, and develops a channel switching code to indicate the respective channel locations of program A and program B, as well as when they are switched.

The channel switching code from the switching control 69 is pulse code modulated in a code transmitter 71, according to the conventional Manchester coding technique transmitted on the carrier frequency $f_3$ and frequency multiplexed onto the main trunk line 73 for transmission downstream to subscriber terminals. However, in a different mechanization the channel switching code could have been modulated onto the carrier frequency $f_3$ by any one of other types of transmitter modulation, including amplitude modulation, frequency modulation, frequency shift keying, phase shift modulation and phase shift keying. In an alternative arrangement, the system could be mechanized to transmit the channel switching code on the same carrier frequency utilized by the composite video and synchronizing signals.

The $f_3$ signal is also applied through a tap 75 on the main trunk line 73 to a code receiver 77, which demodulates the $f_3$ signal to recover the Manchester data. The Manchester data from the code receiver 77 is then decoded in a Manchester decoder 79, with the resultant non-return to-zero (NRZ) and downclocks (DCK) being applied to a decoder 81. The decoder 81 develops a switching signal which is applied to a switching circuit 83.

At the same time that the program A and program B IF signals are being applied to the detectors 61 and 63, respectively, they are also applied to the switching circuit 83. The application of the switching signal to the circuit 83, therefore, causes the switching circuit 83 to develop a program A/B IF output and a program B/A IF output. This means that when program A is on the program A/B output, program B is on the program B/A output, and vice versa. The program A/B IF and program B/A IF signals are applied to channel X and Y transmitters 85 and 87, respectively. The transmitters 85 and 87, respectively, develop $f_1$ and $f_2$ signals which are applied through taps 89 and 91, respectively, on the main trunk line 73 for subsequent transmission downstream to the subscriber terminals. Also frequency multiplexed onto the main trunk line 73, along with the $f_1$, $f_2$ and $f_3$ signals, are signals from other scrambled and unscrambled (free) TV channels (not shown), from the head end site.

The $f_1$, $f_2$ and $f_3$ signals from the head end scrambler 55 as well as other scrambled and unscrambled channels from the head end site are received by an associated frequency converter 97 in each of a plurality of subscriber terminal unscramblers, among which is the subscriber terminal unscrambler 93. Within the unscrambler 93 a filter 95 only allows the channel switching code $f_3$ to be passed to a code receiver 99. The frequency converter 97 is an electronically controlled type, commonly called a varactor-tuned frequency converter. While frequency converters of various internal configurations are possible, the essential feature of the converter 97 in the present application is its property to be controlled by an input control voltage V. With a given input control voltage V, the frequency converter 97 will essentially select one signal frequency band or channel from the plurality of frequency bands or channels in the frequency range for which the converter 97 is designed. Commercially available frequency converters currently encompass the 54–270 megahertz (MHz) range. The converter 97 will then convert this channel signal to a preselected fixed frequency band at the output of the converter 97. The output frequency band or channel of the converter 97 falls within one of the normal VHF channels which can be received by a conventional TV set. When the varactor-tuned frequency converter 97 is used, the TV set 129 is tuned to this channel and need not be changed. All subsequent tuning or channel selection is accomplished by suitable adjustment of the input varactor control voltage V. This relationship can be shown by now referring to FIG. 5.

Figure 5:
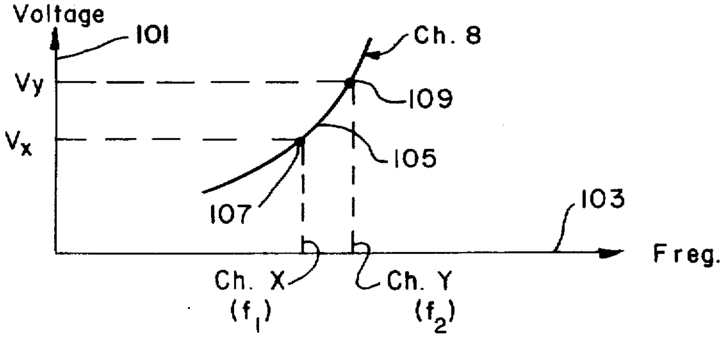

FIG. 5 illustrates the above characteristics of the frequency converter 97. The ordinate axis 101 represents the amplitude of the input control voltage that is required to convert a specific TV input signal to a fixed output channel on the abscissa axis 103. The curve 105 represents, for example, the channel 8 curve. The point 107 along the curve 105 shows that the input control voltage must be equal to $V_X$ before the scrambled channel X signal ($f_1$) will be downconverted by the converter 97 to channel 8. In a like manner, the point 109 along the curve 105 shows that the input control voltage must be equal to $V_Y$ before the scrambled channel Y signal ($f_2$) will be downconverted by the converter 97 to channel 8.

Returning now to FIG. 4, the code receiver 99 demodulates the $f_3$ signal from the filter 95 and applies the resultant output Manchester data to a Manchester decoder 111. The NRZ data and downclocks from the Manchester decoder 111 are applied to a decoder 113 which is similar in structure and operation to the decoder 81 of FIG. 22. The decoder 113 utilizes the four MSB's, CS1 through CS4 or selected channel group, of a selected channel code from a channel select switch 119, along with the NRZ data and downclocks from the decoder 111 to generate and apply the least significant bit CH5 of an input channel code, the four input program code bits PR1-PR4 derived from the NRZ data, a Data OK signal, and a Switching Signal to a program authorization unit 115. One of the bits in the input program code tells the program authorization unit 115 whether the program is a free or pay television program. The remaining three bits in the input program code disclose information relating to the cost of a program if it is a pay television program. The Data OK signal is generated after the decoder 113 has checked the parity of the NRZ data. The switching signal tells the program authorization unit 115 when to switch the programs A and B between the channels X and Y. A subscriber input 117, which may be a card, a pushbutton, etc., is also applied to the program authorization unit 115. In the embodiment being presented the subscriber input 117 may be a card reader which reads a card purchased from the originator of the television program for a fee. By this means, the originator of the television program can exact a fee for the granting of unscrambled viewing and listening privileges to any given subscriber. When the subscriber inserts the purchsed card into the subscriber input 117, which may be a card reader, various bits of information derived from the card are applied to the program authorization unit 115. These bits of information are illustrated to containg a five-bit channel code, C1 through C5, and a three-bit card program code, C6 through C8. The card channel code is used to indicate to the program authorization unit 115 the particular channel that the subscriber desires to receive. The card program code is used to indicate to the program authorization unit 115 the cost or fee extracted for receiving the unscrambled desired channel. In addition to the above-described inputs, the program authorization unit 115 also receives the entire selected channel code CS1 through CS5. The selected channel code is a binary code which indicates which channel the subscriber has selected for reception. The program authorization unit 115 basically compares three of the bits of the input program code with the card program code from the subscriber input 117, and compares the card channel code from the subscriber input 117 with the selected channel code from the channel select or selection switch 119. If the subscriber has selected the channel indicated by the card channel code and there is correspondence between the card program code and the corresponding three bits of input program code from the decoder 113, the program authorization unit 115 will then generate signals which will unscramble a scrambled pay TV program. The program authorization unit 115 also includes circuits which allow the subscriber to receive an unscrambled program without charge, in either a "free" or a "preview" mode of operation. In the "free" mode of operation the subscriber can watch an entire free TV program without charge. In the "preview" mode of operation the subscriber can watch a pay TV program for a predetermined period of time. At the end of that time normal scrambling operation would result unless the subscriber pays or agrees to pay for the rest of the pay TV program. These signals generated by the program authorization unit 115 are digital $X_f$, $Y_f$ differential (diff.) gain and reference (ref.) gain signals. The $X_f$ and $Y_f$ signals are applied to a channel frequency select and switching circuit 121. The circuit 121 also receives the four most significant bits, CS1 through CS4, of the selected channel code from the channel selector switch 119. In response to these four bits of the selected channel code, the channel frequency select and switching circuit 121 internally generates analog voltages for each of channels X and Y to aid in the development of the tuning voltage applied to the converter 97. When the $X_f$ signal is received by the circuit 121, a tuning voltage for the X channel is developed. On the other hand, when the circuit 121 receives the $Y_f$ signal, a tuning voltage for the Y channel is developed.

The tuning voltage from the channel frequency select and switching circuit 121 is applied to the frequency converter 97 to control its frequency such that the frequency presented at the channel 8 output of the converter 97 is determined by the four bits of selected channel code from the switch 119 and by which one of the $X_f$ and $Y_f$ is being applied to the circuit 121 at that time. The output of the frequency converter 97 is applied to a gain control amplifier 127 which has its output coupled to the subscriber's TV set 129.

Due to the fact that two channels are used in the scrambling and unscrambling system herein presented, it is important that the correct tuning voltages from the circuit 121 be developed to enable the frequency converter 97 to alternately tune to each of $f_1$ (which is the video carrier frequency for channel X) and $f_2$ (which is the video carrier frequency for channel Y) when program A is desired, selected, and authorized, and to alternately tune to each of $f_2$ and $f_1$ when program B is desired, selected and authorized. Assume, as discussed in relation to FIG. 5, that the output of the converter 97 is tuned to channel 8. It is therefore quite important that the input video carrier frequency to the television set 129 be precisely tuned to the same frequency and amplitude in channel 8 when either one of the channels X and Y is to be selected by the frequency converter 97. In other words, it is necessary to present the same RF frequency bandwidth and voltage level for channel 8 at the input of the subscriber's television set 129 so that there is no noticeable degradation in the picture quality of the subscriber's set 129 as the selected scrambled program is being unscrambled. To accomplish the above requirements, the output of the gain control amplifier 127 is applied to an AFC error circuit 131. The AFC error circuit 131 selectively responds to the $X_f$ and $Y_f$ signals from the program authorization unit 115 to selectively generate channel X and channel Y error signals. Upon the application of the $X_f$ signal to the circuit 131, the channel X error signal is generated. In a like manner, when the $Y_f$ signal is applied to the circuit 131 the channel Y error signal is generated. These channels X and channel Y error signals are applied to the channel frequency select and switching circuit 121 to correct the tuning voltage as it changes between one level for channel X and another level for channel Y. In this manner, the output frequency of the frequency converter 97 is precisely controlled by the tuning voltage to develop the same RF frequency at its output even though its input is changing between channel X and channel Y.

As discussed above, it is also important that the video carrier voltage level at the output of the amplifier 127 be stabilized to prevent any perceptible flickering as the channels are being switched. To accomplish this, a composite video output from the AFC error circuit 131 is applied to an automatic gain control (AGC) circuit 133. The AGC circuit 133 responds to the composite video input and to the difference gain and reference gain signals from the program authorization unit 115 by developing an AGC voltage to control the output level of the gain control amplifier 127 as the system is switching between channels X and Y. The AGC circuit 133 also develops an IF gain control signal which is applied to the AFC error circuit 131 to stabilize the voltage level of the composite video output of the AFC error circuit 131, when the reference gain signal is selected by the program authorization unit 115.

To further explain the switching operation of the system illustrated in FIG. 4, FIG. 6 will now be discussed. Waveform 135 illustrates that the program content is interchanged between channels X and Y at the variable times $t_1$, $t_2$, $t_4$, $t_5$, $t_8$, $t_9$ and $t_{11}$. It should, however, be understood that the above switching times are for illustrative purposes only, and other times could have been selected in any predetermined order, or even in a random order.

At each of the above switching times the level of a switching signal 137 from the decoder 81 changes from, for example, 0 volts to +5 volts or from +5 volts to 0 volts. As will be described later in relation to FIG. 23, two complementary signals 139 and 141 are developed by the switching circuit 83 for use in switching the programs A and B between the channels X and Y at the switching times indicated in the waveform 135. The waveform 139 is in phase (+) with the waveform 137, while the waveform 141 is 180 degrees out of phase (−) with the waveform 137.

In the mechanization of the switching circuit 83 (as shown in FIG. 23) the levels of the waveforms 139 and 141 are shifted between positive and negative two volt levels. With the internal utilization of the waveforms 139 and 141 to switch the A and B programs within the switching circuit 83, the A and B programs are selectively scrambled at the outputs of each of the channel X and channel Y transmitters 85 and 87, as indicated by the sectionalized blocks in the waveforms 143 and 145, respectively. The signals transmitted on channel X, as shown in the waveform 143, consist of periods of variable time duration devoted to program A and program B, alternatively. As shown in the waveform 145, the signals transmitted on channel Y consist of program B during the time program A is being transmitted on channel X, and of program A during the time program B is being transmitted on channel X.

The scrambling effect is thus achieved in either channel X or channel Y by alternately switching the programs A and B in that channel. The degree of scrambling is related to the actual time durations employed and the variations of time periods allotted to the switching sequences. At very low switching frequencies (less than 1 cycle per second), the scrambling is relatively low in terms of destroying intelligibility, but may prove inconvenient for the viewer. At higher and variable switching rates, the degree of scrambling and inconvenience to the viewer can be increased to the point of substantial loss of all intelligibility with regard to commonly transmitted program content.

The unscrambling of the A and B programs is respectively illustrated by the waveforms 147 and 149. Unscrambling circuits located within the subscriber terminal unscrambler 93 (FIG. 4) reconstitute or unscramble the scrambled channel X ($f_1$) and channel Y ($f_2$) transmissions by selectively switching back and forth between the channels X ($f_1$) and Y ($f_2$) at the appropriate times to cause either program A or program B to be recovered at the output of the converter 97.

The blocks of FIG. 4 requiring more elaboration will now be discussed in more detail to give a clearer understanding of the invention.

Figure 7:
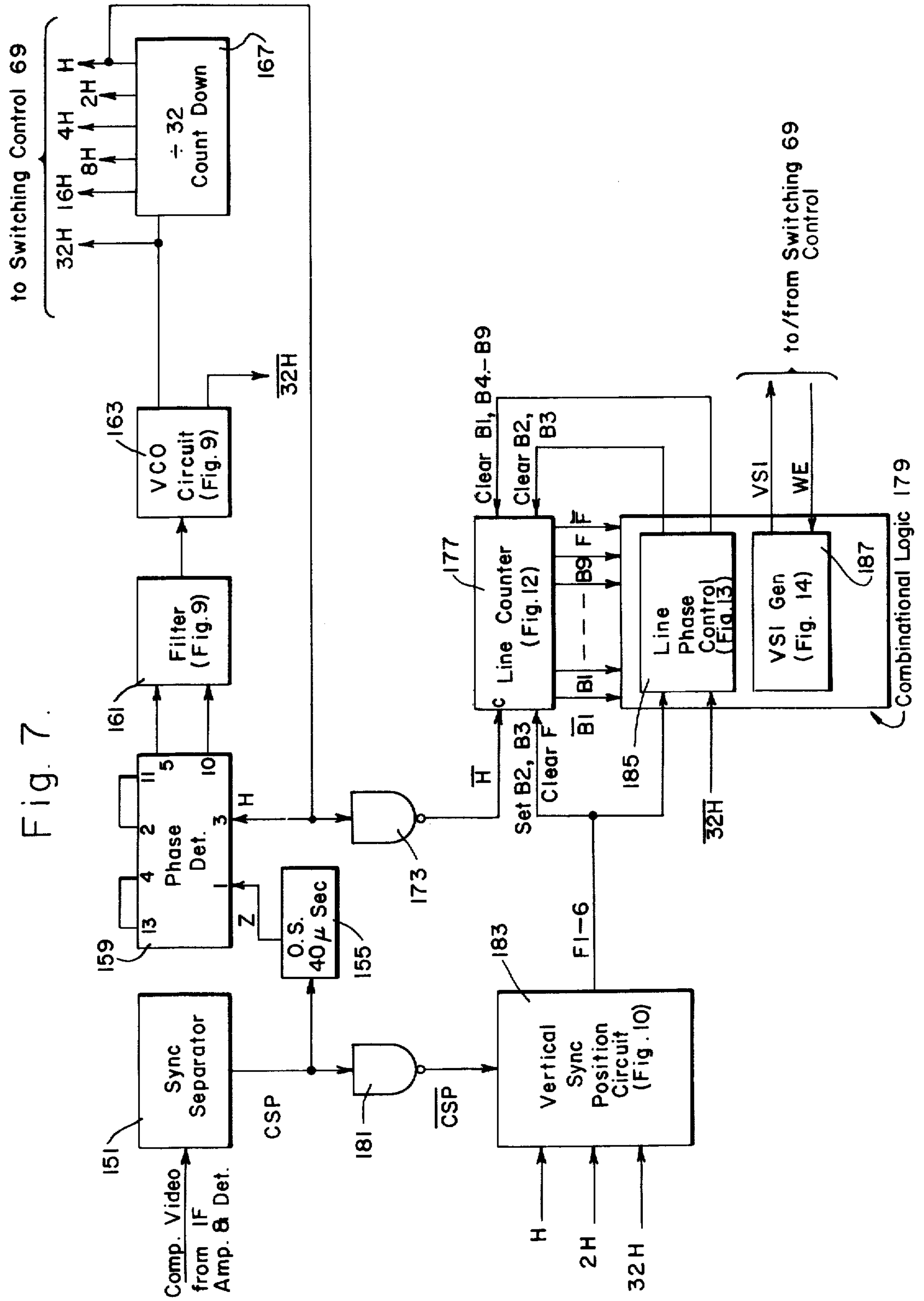
FIG. 7 illustrates a block diagram of one of the control logic circuits of FIG. 4.

FIG. 7 illustrates the control logic 23 or 25 of FIG. 4. Some of the waveforms of FIG. 8 will also be discussed during the explanation of FIG. 7.

The composite video from a corresponding one of the IF amplifier and detectors 61 and 63 is applied to sync separator 151. The sync separator 151 extracts the composite sync pulses 153 and applies them to a one shot multivibrator 155. The composite sync pulses 153 are illustrated by the waveforms **153*a* and 153*b*, with both of the waveforms 153*a* and 153*b* containing regular horizontal sync pulses, followed by six equalization pulses, six vertical sync pulses, six more equalization pulses and then regular horizontal sync pulses. It should be noted that the first equalization pulses in the waveform 153*b* is considered as part of field 1, with field 2 starting with the second equalization pulse. In the waveform 153*a*, field 1 starts with the first equalization pulse. The waveforms 153*a* and 153*b* are conventional representations of the normal pulses found in composite sync pulse trains in fields 1 and 2** of a TV scan.

The one shot multivibrator 155 has a pulse duration of 40 microseconds. Since the interpulse period between adjacent horizontal sync pulses is approximately 63 microseconds and there are two equalization pulses or two vertical sync pulses occurring during the interval between adjacent horizontal sync pulses, an output will be developed by the one shot 155 for each horizontal sync pulse and for only one of every two equalization pulses or two vertical sync pulses. The output of the one shot multivibrator 155 can be represented by Z and is shown by the waveform 157 for either of the composite sync pulse waveforms **153*a* and 153*b*. As can be seen in the waveforms 153*a*, 153*b* and 157, the one shot 155 triggers on the negative edges of either of the waveforms 153a and 153b** when it is in its quiescent condition.

The Z output from the one shot multivibrator 155 is applied to pin 1 of a phase detector 159. The phase detector 159 may be any conventional phase detector, such as a Motorola MC 4044 described in the associated Motorola data sheet. A second input H is applied to pin 3 of the phase detector 159. The phase detector 159 looks at the negative edges of the Z and H waveforms. Basically, a positive voltage is developed by the phase detector with respect to a reference potential in a filter 161, if Z occurs before H. A positive voltage indicates that the frequency of H is too low. If H occurs before Z, a negative voltage with respect to the reference potential in the filter 161 is developed by the phase detector 159. On the other hand, if there is coincidence between the negative edges of Z and H a 0 voltage is developed by the phase detector 159 with respect to the reference potential in the filter 161.

The output of the phase detector 159 is applied to the filter 16 which utilizes the output from the phase detector 159 to develop and apply a voltage to a voltage controlled oscillator (VCO) circuit 163 to change the frequency of the VCO circuit 163. The VCO circuit 163 can utilize, for example, a Motorola MC 4024 described and illustrated in the associated Motorola data sheet.

The VCO circuit 163 operates at a frequency equal to 32 times the horizontal scan rate of the television channel. The VCO circuit develops two complementary outputs which will be designated as 32H and $\overline{\textbf{32H}}$. The 32H output of the VCO is applied to a divide by 32 (÷32) countdown 167 which count downs the 32H input to develop 16H, 8H, 4H, 2H and H outputs in a conventional manner. The 2H and H outputs of the countdown 167 are illustrated by the waveforms 169 and 171, with the frequency of the H waveform 171 being equal to the horizontal scan rate of the television channel. It is the H waveform 171 which is compared with the z waveform 157 in the phase detector 159 which causes the VCO circuit 163 to be locked to a frequency equal to 32 times the horizontal scan rate. The phase detector 159, filter 161, VCO circuit 163 and countdown 167 form a phase locked loop for stabilizing the output frequency of the VCO circuit 163 such that the frequency of the H waveform 171 is phase and frequency locked to the Z waveform 157.

The H waveform 171 is inverted by an inverter 173 to develop the $\overline{H}$ waveform 175, which is applied to the clock (C) input of a line counter 177. The line counter counts each negative-to-positive transition of the $\overline{H}$ waveform 175 to indicate the vertical position or number of horizontal lines at any given time. The line counter 177 develops and applies $\overline{\textbf{B1}}$, B1–B9, F and $\overline{F}$ outputs to a combinational logic circuit 179.

The composite sync pulse 153a or 153b are inverted by an inverter 181 and applied to a vertical sync position circuit 183. Other inputs applied to the circuit 183 are the 32H, 2H and H outputs from the countdown 167. In response to its inputs the vertical sync position circuit 183 develops an F1-6 output each time that the circuit 183 senses that it is in the sixth line of field 1. The F1-6 output from the circuit 183 is applied to the line counter 177 and to a line phase control circuit 185 contained within the combinational logic 179. The $\overline{\textbf{32H}}$ output from the VCO circuit 163 is also applied to the line phase control 185. In response to the F1-6 and $\overline{\textbf{32H}}$ inputs the line phase control 185 applies signals to the line counter 177 to enable the line counter to line up with the composite video input to the sync separator 151 and count in the same phase. In this manner the line counter 177 becomes phase locked, as well as frequency locked, to the video field rate, wherein field 1 counts up to 263 and then starts over and field 2 counts up to 262 and then starts over.

A vertical sync interval (VSI) generator 187 is also contained in the combinational logic 179. The VSI generator generates the VSI pulse or signal to start a window during which time the switching signal can be generated because it occurs during the vertical blanking. This VSI signal is applied to the switching control circuit 69 (FIG. 4). When the switching control circuit 69 determines through its logic circuits to terminate the window initiated by the VSI signal, it generates and applies the window end (WE) signal to the VSI generator 187 to terminate the VSI output.

The control logic circuit 65 only applies its VSI signal to the switching control 69, whereas the control logic circuit 67 applies its 32H, $\overline{\textbf{32H}}$, 16H, 8H, 4H, 2H, and H outputs to the switching control 69 as timing signals. This breakdown of the signals between the control logic circuits 65 and 67 is due to the fact that it is desired that the control logic circuit 65 determine what portion of the vertical sync interval can be utilized for switching the control logic circuit 67 determines which portion of which horizontal line occurring during the vertical retrace that the system will switch in.

Figures 9, 10:
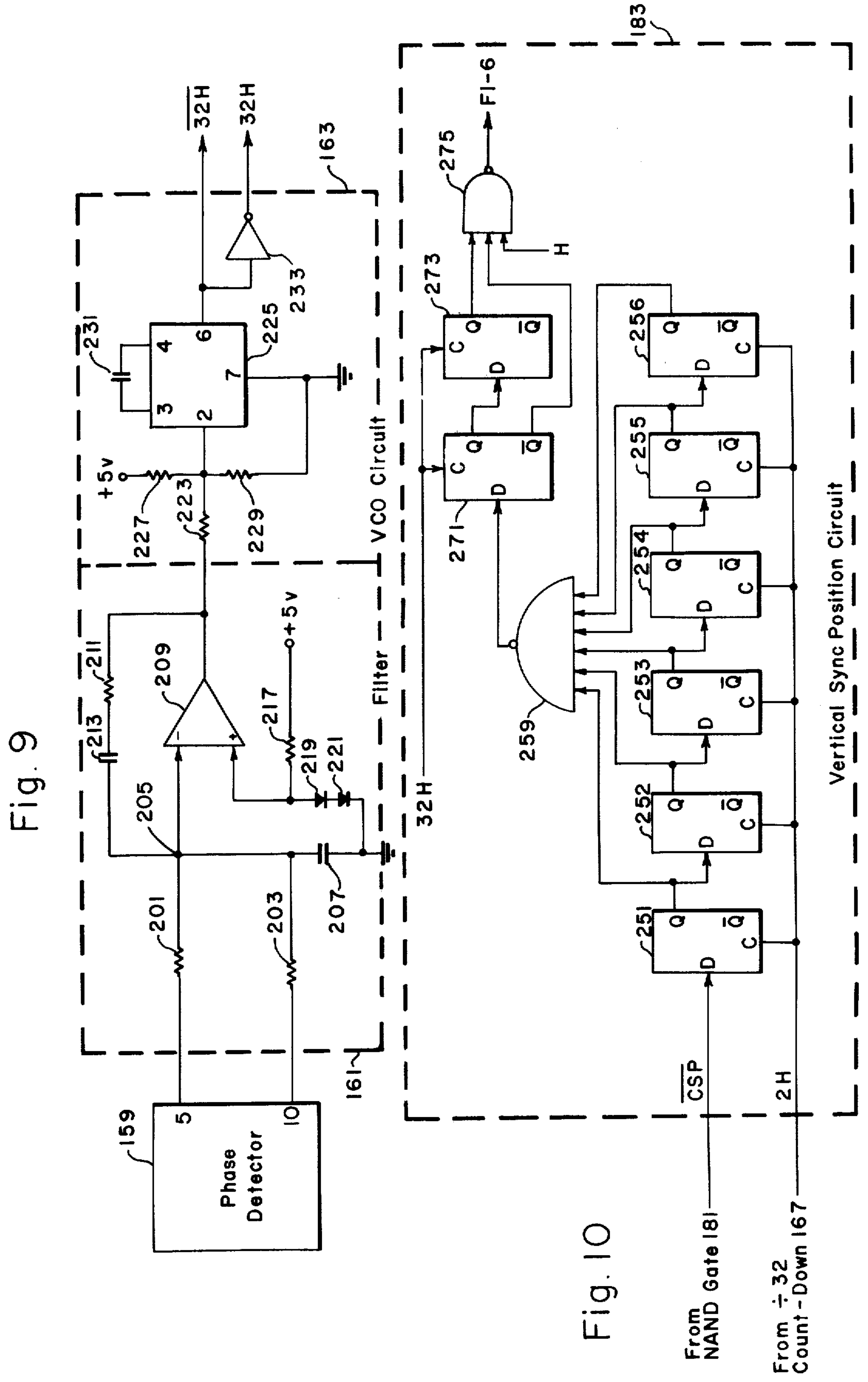
FIG. 9 illustrates a combination schematic and block diagram of the filter and VCO circuits of FIG. 7.
FIG. 10 illustrates a block diagram of the vertical sync position circuit of FIG. 7.

Referring now to FIG. 9, the filter 161 and VCO circuit 163 will now be discussed in more detail. The outputs from pins 5 and 10 of the phase detector 159 are respectively coupled through resistors 201 and 203 to a common junction 205. A capacitor 207 coupled between the common junction point 205 and ground develops a voltage which is applied to the inverting side of an operational amplifier 209. The feedback path of the operational amplifier 209 is comprised of a serially coupled resistor 211 and capacitor 213 combination which is coupled between the output and the inverting input. A reference voltage applied to the noninverting input of the operational amplifier 209 is developed from a serially coupled voltage divider arrangement consisting of a resistor 217, diode 219 and diode 221, coupled between, for example, a positive 5 volt potential and ground. The reference voltage for the noninverting input is applied from the junction of the resistor 217 and the diode 219 to enable an approximate 1.5 V reference level to be developed. This reference voltage is the reference voltage spoken of in relation to the discussion of the phase detector 159 in FIG. 7.

In the operation of the filter 161, when the output of the VCO circuit 163 is too high in frequency, current flows from pin 5 of the phase detector 159 through the resistor 201 to the common junction point 205. On the other hand, when the output of the VCO circuit 163 is too low in frequency, current flows from the feedback path of the operational amplifier 209, through the common junction point 205 and resistor 203, to pin 10 of the phase detector 159. In this manner, the operational amplifier 209 develops a positive voltage output when the VCO circuit 163 is too low in frequency, and develops a negative output voltage when the VCO 163 is too high in frequency.

The output of the operational amplifier 209 in the filter 161 is therefore applied to the VCO circuit 163 to control its output frequency. More specifically, the output of the operational amplifier 209 is applied through a resistor 223 to pin 2 of a VCO 225. Also coupled to pin 2 of the VCO 225 is the junction of serially coupled resistors 227 and 229 which are respectively coupled between positive 5V and ground to develop a reference voltage for the VCO 225. For proper operation of the VCO 225, pin 7 is grounded and a capacitor 231 is coupled between pins 3 and 4. The $\overline{32H}$ output from the VCO circuit 163 is taken from pin 6 of the VCO 225. A second output from pin 6 of the VCO 225 is inverted by an inverter 233 to develop the 32H output from the VCO circuit 163.

Referring now to FIG. 10, the vertical sync position circuit 183 will now be discussed in more detail. To aid in the understanding of the circuit 183, the remaining waveforms of FIG. 8 as well as the waveforms of FIG. 11 will also be referred to. As specified previously, the vertical sync position circuit develops and F1-6 output each time that line 6 of field 1 occurs. The $\overline{CSP}$ pulses from the NAND gate 181 (FIG. 7) are applied to the D input of a D flip-flop 251, which is the input stage of a six-stage shift register comprising D flip-flops 251 through 256. The flip-flops 251 through 256 are cascade coupled to each other with the Q output of the stage being coupled to the D input of the following stage. The 2H output from the divide by 32 countdown 167 (FIG. 7) are utilized as clock pulses to the clock inputs of the flip-flops 251 through 256. These D flip-flops 251 through 256 trigger on the positive edge of the clock pulse 2H.

By comparing the 2H waveform 169 with the waveforms 153*a* and 153*b*, and recalling that the waveforms 153*a* and 153*b* are inverted by the NAND gate 181, it can be seen in waveform 260 (FIG. 8) that the flip-flop 251 will only develop a 1 state signal at its Q output at the 2H clock pulse times $t_0$ through $t_5$ of field 2 in the waveform 153*b*. It is during the period $t_0$ through $t_6$ of field 2 that the field 2 vertical sync pulses occur. In a like manner, as shown in the waveform 261, the flip-flop 251 will also develop a 1 state signal at its Q output at the 2H clock pulse times $t_1$ through $t_6$ of field 1 in the waveform 153*a*. It is during the period $t_1$ through $t_7$ of field 1 that the field 1 vertical sync pulses occur. At any other times when the positive going edge of a 2H pulse 169 occurs the inversion of the CSP pulses 153 will cause a 0 to be developed at the Q output of the flip-flop 251. In its operational state each of the flip-flops 251 to 256 will develop at its associated Q output that state that existed at its D input at the time of each positive-going edge of a 2H pulse 169. It is, therefore, obvious that the flip-flop 251 will only develop a 1 state output for each vertical sync pulse occurring during the vertical sync interval. It will be recalled that the vertical sync interval encompasses that period of time during which the first six equalization pulses, the six vertical sync pulses and the last six equalization pulses are generated during each of fields 1 and 2.

The waveforms 261 through 266 respectively illustrate the waveforms appearing at the Q outputs of the flip-flops 251 to 256 during the period from $t_1$ through $t_{12}$ of field 1. It is only during the interval between the times $t_6$ and $t_7$ of field 1, or between the times $t_5$ and $t_6$ of field 2, that all of the flip-flops 251 through 256 develop 1 state signals at their Q outputs. The Q outputs of each of these flip-flops 251 through 256 are utilized as inputs to a NAND gate 259. During the interval between $t_6$ and $t_7$ of field 1, or the interval between $t_5$ and $t_6$ of field 2, all of the inputs to the NAND gate 259 are in a 1 state condition. As a result the output of the NAND gate 259 will develop a 0 state signal during the $t_5$–$t_6$ interval of field 2 or during the $t_6$– $t_7$ interval of field 1.

The waveform 260 shows that the Q output of the flip-flop 251 changes to a 1 state at time $t_0$ due to the fact that the first vertical sync pulse in the vertical sync interval of field 2 occurs one horizontal sync pulse interval earlier than that in field 1. The waveforms 260 through 265 can also be used to represent the Q outputs of the flip-flops 251 through 255 at the times $t_0$ through $t_6$ of field 2. It can, therefore, be seen that the NAND gate 259 will develop a 0 state output on the sixth vertical sync pulse of the vertical sync interval for each of fields 1 and 2.

Figure 11:
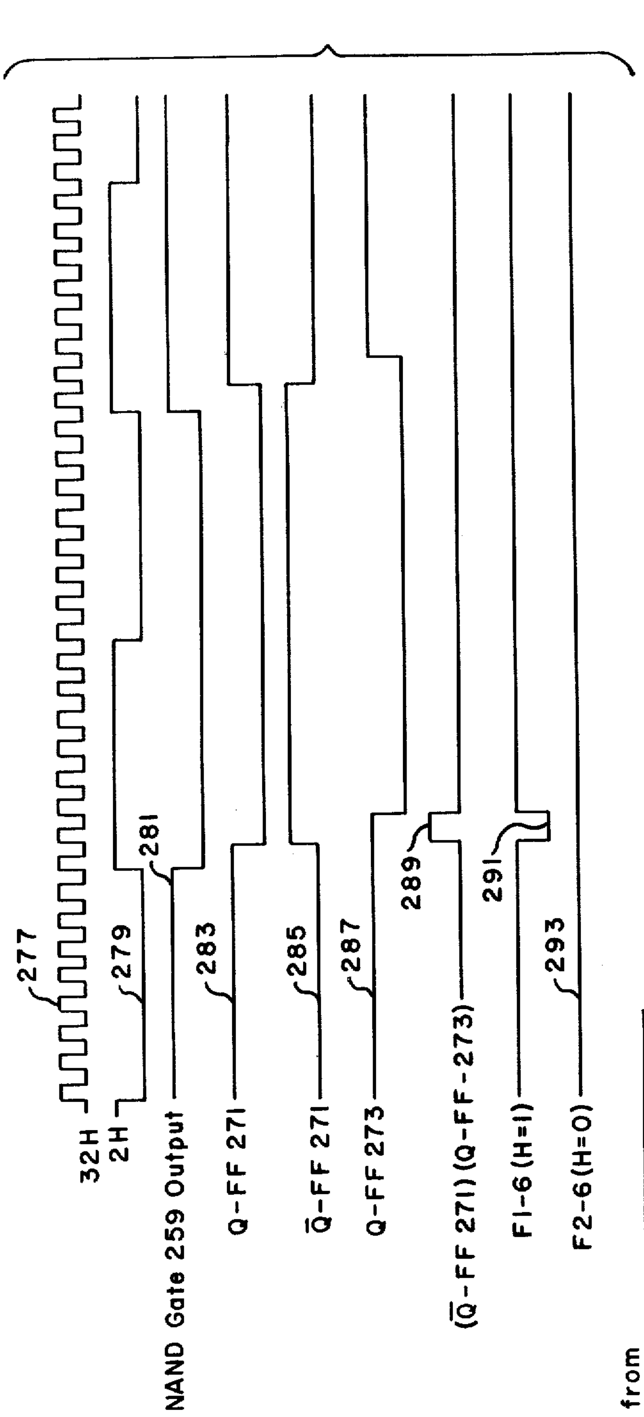
FIG. 11 illustrates additional waveforms useful in explaining the operation of the circuit of FIG. 10.

The output of the NAND gate 259 is applied to the D input of a D flip-flop 271 which is clocked by the 32H pulses illustrated in the waveform 277 of FIG. 11. The Q and $\overline{Q}$ outputs of the flip-flop 271 are respectively applied to the D input of a D flip-flop 273 and to a first input of a NAND gate 275. The D flip-flop 273 is also clocked by the 32H pulses 277, and has its $\overline{Q}$ output coupled to a second input of the NAND gate 275. The H output of the divide by 32 countdown 167 is applied to a third input of the NAND gate 275. The 2H pulses applied as clock pulses to the flip-flops 251 through 256 are shown by the waveform 279. The NAND gate 259 signal output is illustrated by the waveform 281. When the waveform 281 is applied to the D input of the flip-flop 271, the inherent delay in the flip-flop 271 will cause the flip-flop 271 to remain in a 0 state until the next 0 to 1 transition of the 32H clock 277. At this time the Q output of the flip-flop 271 changes from a 1 state to a 0 state, as shown in the waveform 283, while the $\overline{Q}$ output of the flip-flop 271 changes from a 0 to a 1 state as indicated by the waveform 285. The 1 to 0 transition of the waveform 283, which is applied to the D input of the flip-flop 273, will not cause the flip-flop 273 to change its output state until one 32H pulse later, as indicated by the waveform 287.

The NAND gate 273 will only develop a 0 state output when all three of its inputs are in binary 1 states. As shown in the waveform 289 the $\overline{Q}$ output of the flip-flop 271 and the Q output of the flip-flop 273 are both in a 1 state for only a short duration of time. The output of the NAND gate 275 therefore hinges on the state of the H pulses. Referring back to the waveform 171 in FIG. 8, it can be seen that, at the time of a 0 to 1 transition of an associated 2H pulse 169, H is high on the sixth vertical sync pulse in field 1, and low on the sixth vertical sync pulse in field 2. As a result, during the sixth line of field 1 when the $\overline{Q}$ output of flip-flop 271 and the Q output of flip-flop 273 are both in 1 states, a 0 state F1-6 output will be developed by the NAND gate 275, as indicated by the waveform 291. On the other hand, during the sicth line of field 2 (F2-6), a 0 output will always be developed, since H is in a 0 state at this time, as shown by the waveform 293.

Figure 12:
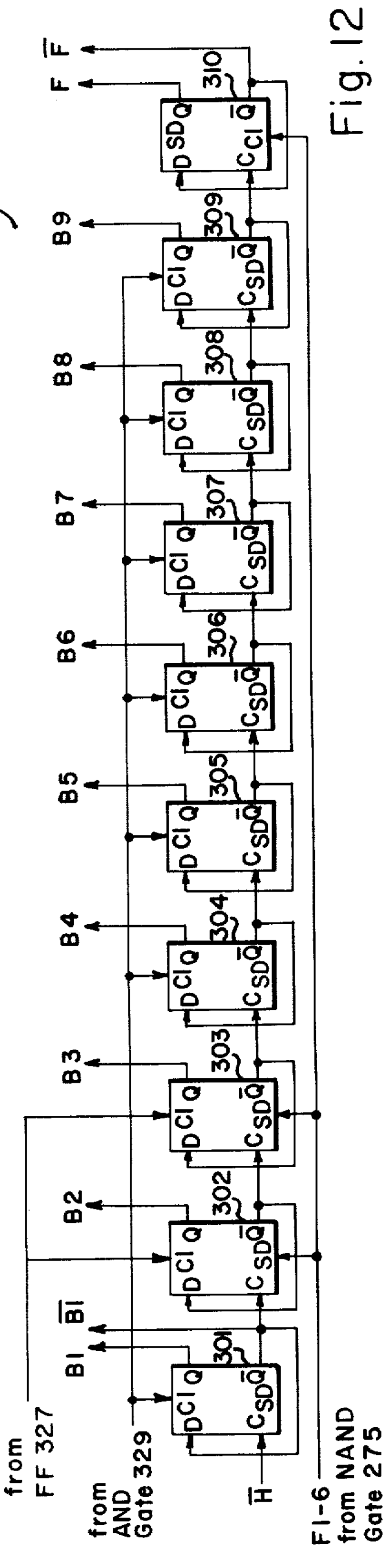
FIG. 12 illustrates a block diagram of the line counter of FIG. 7.

Referring now to FIG. 12, the line counter 177 is shown, being comprised of 10 cascade-coupled D flip-flops 301 through 310. It should be recalled that the line counter 177 was frequency but not phase locked to the video field rate 262 or 263. The line counter 177 counts the 0 to 1 transitions in the $\overline{H}$ inputs in order to develop outputs which indicate the number of lines being counted in each field. Each of the D flip-flops 301 through 310 is arranged such that its $\overline{Q}$ output is coupled to its D input and also to the clock input of the following flip-flop. The $\overline{H}$ input is applied to the clock input of the flip-flop 301. On the positive going transition of each $\overline{H}$ input, whatever was at its $\overline{Q}$ output before the positive going transition is clocked to the Q output after the transition. The $B_1$ and $\overline{B_1}$ outputs are taken from the Q and $\overline{Q}$ outputs, respectively, of the flip-flop 301. In a like manner the $B_2$ through $B_9$ outputs are respectively taken from the Q outputs of the flip-flops 302 through 309. The remaining outputs from the line counter 177 are F and $\overline{F}$ outputs which are respectively taken from the Q and $\overline{Q}$ sides of the flip-flop 310.

Figure 8:
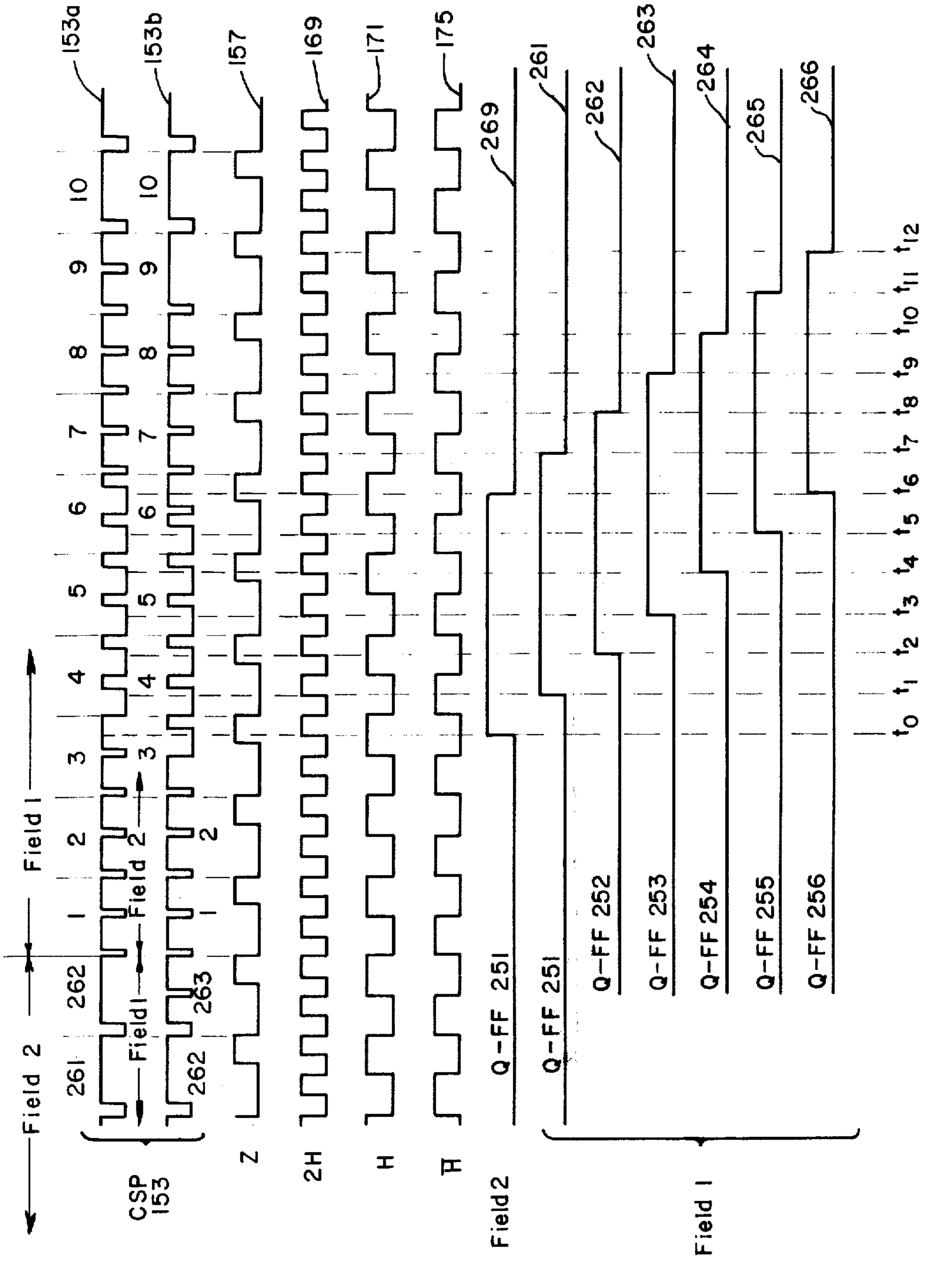
FIG. 8 illustrates waveforms useful in explaining the operation of the circuits of FIGS. 7 and 10.

Because it would have a tendency to count lines at the correct frequency of the horizontal sync without the line numbers lining up with the line numbers shown in regard to the CSP's of the waveform 153*a* or 153*b* of FIG. 8, it must be phase locked to the video field rate so that the decoded line number of the countdown will correspond to the line numbers shown in regard to the CSP waveform 153*a* or 153*b* of FIG. 8.

Figure 13:
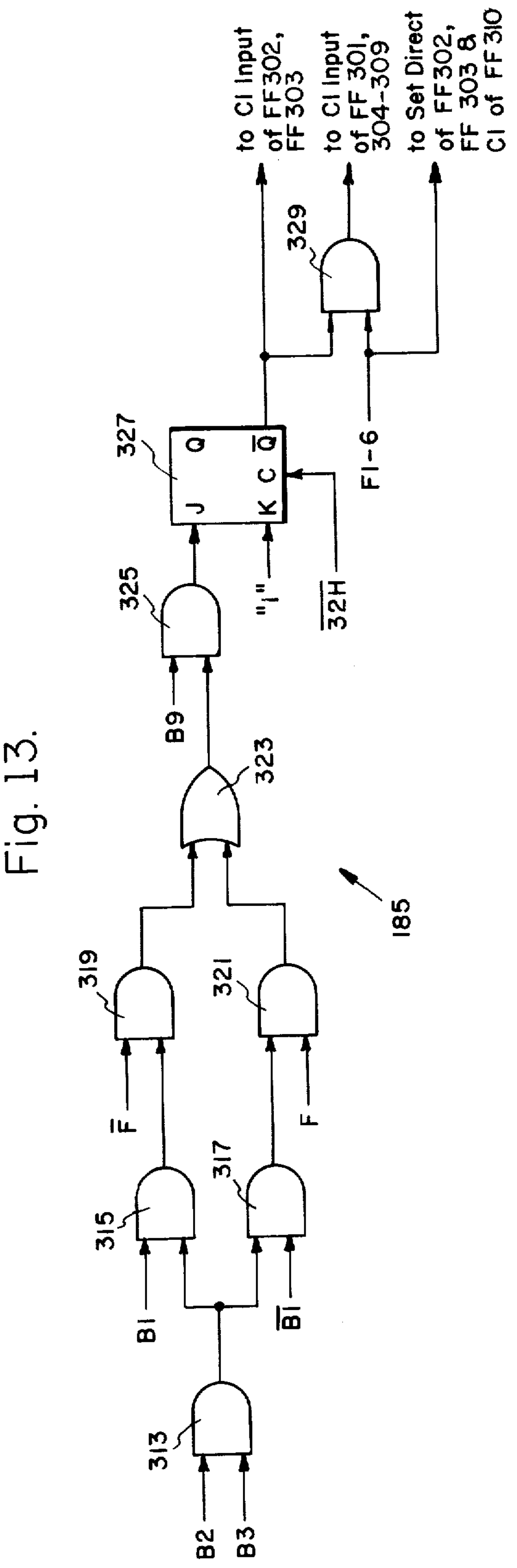
FIGS. 13 and 14 respectively illustrate block diagrams of the line phase control and VSI generator circuits of FIG. 7.

To accomplish the above objective, the outputs from flip-flop 327 and from AND gate 320 (to be discussed later) in the line phase control 185 of FIG. 13 are utilized to clear preselected ones of the flip-flops in the line counter 177. More specifically, the output from the flip-flop 327 is utilized to clear the flip-flops 302 and 303 while the output from the AND gate 329 is utilized to clear the flip-flops 301 and 304 through 309. Each of these D flip-flops 301 through 310 is cleared by the application of a 0 state signal to its clear input, thereby causing its Q output to change to a 0 state. In addition to the above, the F1-6 signal from NAND gate 275 is applied to the set direct (SD) inputs of the flip-flops 302 and 303 and to the clear input of the flip-flop 310. The application of a 0 state signal to the SD inputs of the flip-flops 302 and 303 causes each of the Q outputs of these flip-flops to go to a 1 state. The signals from the flip-flop 327 and AND gate 329, as well as the F1-6 signal cause the line counter 177 to line its outputs up to the count of is associated composite video input and make the line counter 177 count in the right phase.

The counters 301 through 309 are used to binarily indicate the line count in a field, while the flip-flop 310 is used to indicate which field is present. When field 1 is present, the F output from the Q side of flip-flop 310 is in a 0 state. When field 2 is present the $\overline{F}$ output of the $\overline{Q}$ side of flip-flop 310 is in a 1 state. It should be recalled at this time that the outputs $B_1$ through $B_9$ count binarily from 0 to 263 in field 1, and then are reset to 0 states to enable the outputs $B_1$ through $B_9$ to count binarily from 0 to 262 in field 2 before being reset to repeat the above cyclical operation. The line phase control 185, which phase locks the line count of the line counter 177 to the line count of the video field rate, will now be discussed by referring to FIG. 13.

In FIG. 13 the $B_2$ and $B_3$ outputs from the flip-flops 302 and 303, respectively, are applied to an AND gate 313 which, in turn, has its output applied to AND gates 315 and 317. The $B_1$ and $\overline{B_1}$ outputs from the flip-flop 301 are respectively applied to second inputs of the AND gates 315 and 317. The AND gate 315 develops a 1 state output whenever the count of the line counter 177 is the binary equivalent of 7 + 8N, where N equals any integer from 0 to 32 inclusive. As a result, the AND gate 315 is used to decode a binary count of 7 for the line count of 263 in field 1. On the other hand, the AND gate 317 develops a 1 state output when the count of the line counter 177 is the binary equivalent of 6 + 8N, where N equals any integer from 0 to 32 inclusive. As a result, the AND gate 317 decodes a binary count of 6 for the line count of 262 in field 2. In other words, the AND gate 317 decodes or produces a 1 state output whenever the $B_3$, $B_2$ and $B_1$ outputs are in the binary 1, 1 and 0 states, while the AND gate 315 decodes or produces a 1 state output whenever the $B_3$, $B_2$ and $B_1$ outputs are in binary 1, 1 and 1 states.

The outputs of the AND gates 315 and 317 are applied to inputs of AND gates 319 and 321, respectively. The $\overline{F}$ and F outputs from the flip-flop 310 are respectively applied to second inputs of the AND gates 319 and 321. It should be recalled that during field 1, F = 0 and $\overline{F}$ = 1, and that during field 2, F = 1 and $\overline{F}$ = 0. As a consequence, the AND gate 319 will only develop 1 state outputs during field 1, and the AND gate 321 will only develop 1 state outputs during field 2.

The outputs of the AND gates 319 and 321 are applied to inputs of an OR gate 323 which has its output coupled to an AND gate 325. The $B_9$ signal is applied to a second input of the AND gate 325. Since the $B_9$ signal from the Q side of the flip-flop 309 will change its output from a 0 state to a 1 state every 256th $\overline{H}$ input, the AND gate 325 will only develop a 1 state output when a binary count of 263 appears at the output of the line counter 177 during field 1, or when a binary count of 262 appears at the output of the line counter 177 during field 2. The output of the AND gate 325 is applied to the J input of a JK flip-flop 327 which is clocked by the negative-going edges of the $\overline{32H}$ output of the VCO circuit 163. A constant positive 1 state signal is applied to the K input of the flip-flop 327. In the quiescent state of the flip-flop 327, the Q and $\overline{Q}$ outputs of the flip-flop 327 are in 0 and 1 binary states, respectively. Whenever the AND gate 325 develops and applies a 1 state signal to the J input of the flip-flop 327, the $\overline{Q}$ output of the flip-flop 327 temporarily changes to a 0 state. It is at this time that the 0 state signal from the $\overline{Q}$ side of the flip-flop 327 is used to clear the flip-flops 302 and 303 in the line counter 177 to cause the Q outputs of the flip-flops 302 and 303 ($B_2$ and $B_3$, respectively) to go to 0 states. The $\overline{Q}$ output of the flip-flop 327 is also applied to one input of an AND gate 329. The F1-6 output from the vertical sync position circuit 183 in FIG. 10 is applied to a second input of the AND gate 329. It should be recalled that the F1-6 signal, which is generated during the sixth line of field 1, is in a 0 state at that time since H is in a 1 state at that time. As a result, the AND gate 329 develops a 0 state output whenever the line counter 177 reaches a count of 263 in field 1, or 262 in field 2, or during the sixth line of field 1 when the F1-6 pulse is generated. This 0 state output of the AND gate 329, as specified before, is used to clear the flip-flops 301 and 304 through 309 to cause their Q outputs to be changed to 0 states at those times. The F1-6 signal is also applied to the set direct (SD) inputs of the flip-flops 302 and 303 to cause their Q outputs to go to a 1 state. Since at the time of the generation of the F1-6 pulse the flip-flops 301 and 304 through 309 have been cleared while the flip-flops 302 and 303 have been set, the line counter will indicate a binary count of six at its outputs $B_1$ through $B_9$. Also at the time of the generation of the F1-6 pulse the Q of the flip-flop 310 will be set by the F1-6 pulse to be in a 0 state to indicate that we are in field 1. In this manner the line counter 177 is forced by the line phase control 185 into a phase-locked condition with the video field rate as shown in waveforms 153*a* and 153*b* of FIG. 8.

Figure 14:
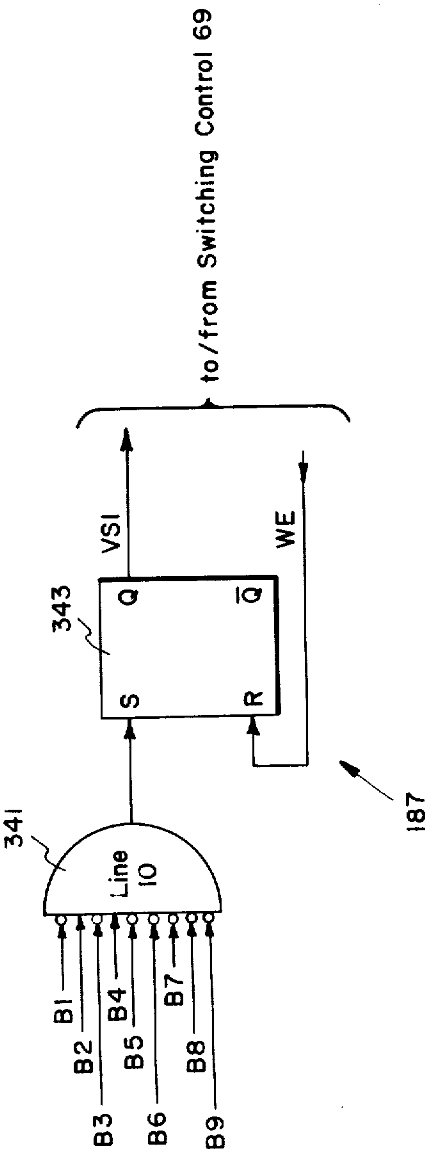

The VSI generator 187 which is contained in the combinational logic 179 is illustrated in FIG. 14. The VSI generator 187 basically consists of a nine input "LINE 10" AND gate 341 which has its output coupled to the set side of a reset flip-flop 343. The $B_1$ through $B_9$ outputs from the line counter 177 are applied to the inputs of the AND gate 341, with the $B_1$, $B_3$ and $B_5$ through $B_9$ signals being inverted at the inputs of the AND gate 341. In this manner the AND gate has been illustrated to be mechanized to develop a 1 state output only during line 10 of the line counter 177. It should, however, be understood that the AND gate 341 could have been mechanized to develop a 1 state output during any other given line or lines from the line counter 177.

When the output of the AND gate 341 changes from a 0 state to a 1 state at the start of line 10, the flip-flop 343 changes to a set condition wherein its Q output goes to a 1 state. The Q output of the flip-flop 343 develops the vertical sync interval (VSI) signal which starts a window during which channels X and Y can be switched. In this case line 10 was selected because it occurs during the vertical blanking period.

The program A VSI signal from the VSI generator 187 in the control logic 65 is applied to the switching control 69 in FIG. 4. After the switching control 69 has utilized the timing signals ($\overline{32H}$, 32H 16H 8H, 4H, 2H and H) from the control logic 67 and generated a channel switching code, it generates a window end (WE) signal which is utilized by the VSI generator 187 to internally terminate the VSI signal by resetting the flip-flop 343.

Figure 15:
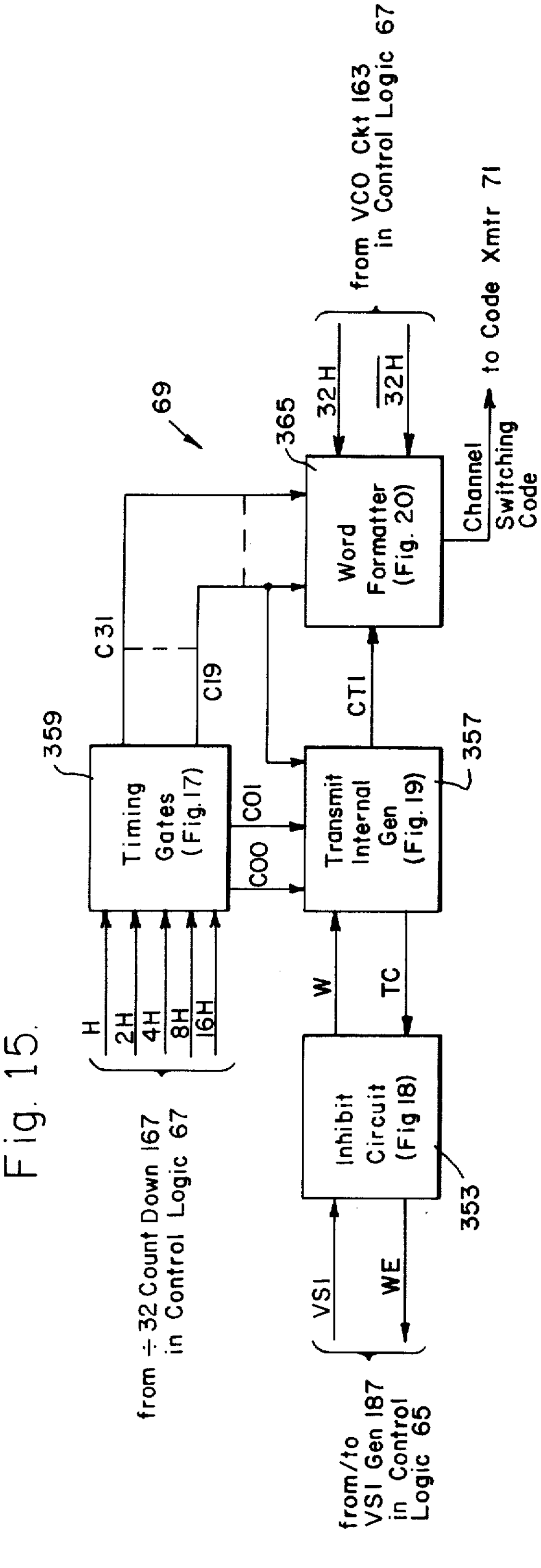
FIG. 15 illustrates a block diagram of the switching control circuit of FIG. 4.

The generation of the WE signal will now be explained by referring to the switching control 69 and associated waveforms respectively illustrated in FIGS. 15 and 16. The VSI signal, as illustrated in the waveform 351, from the VSI generator 187 is applied to an inhibit circuit 353. If the inhibit circuit 353 does not internally inhibit the VSI pulse, a window (W) pulse, as illustrated by the waveform 355, is generated and applied to a transmit interval generator 357.

The 16H, 8H, 4H, 2H and H outputs from the divide by 32 countdown 167 in the program B control logic 67 are applied to a timing gates circuit 359. The timing gates circuit 359 utilizes these timing signals from the countdown 167 such that at each negative-going transition of the H input, which is illustrated in the waveform 361, a 0 count (C00) pulse is generated. The C00 pulses are illustrated by the waveform 363. A 1 count (C00 pulse) and counts 19 through 31 (C19–C31) are also generated by the timing gates 369 from these input timing signals from the countdown 167. The C19 through C31 counts are applied to a word formatter 365, while the C00, C01 and C19 counts are applied to the transmit interval generator 357.

The transmit interval generator 357 internally generates a transmit window (TW) which is illustrated by the waveform 367. This TW signal will be further explained in FIG. 19. However, at this time it will suffice to say it is used to generate a code transmit interval (CTI) gate 369, which is shown in the waveform 369.

It is during the CTI interval that the word formatter is allowed to send a channel switching code to the code transmitter 71 (FIG. 4) during the CTI interval at each of the counts C19 through C31 from the timing gates 359. The word formatter 365 sends a signal which is either in phase with a 32H input or in phase with a $\overline{32H}$ input from the VCO circuit 163 in the channel B control logic 67. At the completion of the message, which occurs at the end of the CTI interval 369, the transmit interval generator 357 generates a transmit complete (TC) signal which is applied to the inhibit circuit 353. In response to the TC signal the inhibit circuit generates the window end (WE) signal as illustrated by the pulse 371.

Assume that a VSI signal 373 has been generated by the VSI generator 187 and inhibited by the inhibit circuit 353. In this case a window (W) 355 will not be generated by the inhibit circuit 353. As a consequence neither will a TW waveform 367 or CTI waveform 369 be generated by the transmit interval generator 357. However, in cases where the VSI signal is inhibited the inhibit circuit 353 will internally produce a signal (to be explained later) which will soon thereafter result in the generation of a WE pulse 375.

Figure 16:
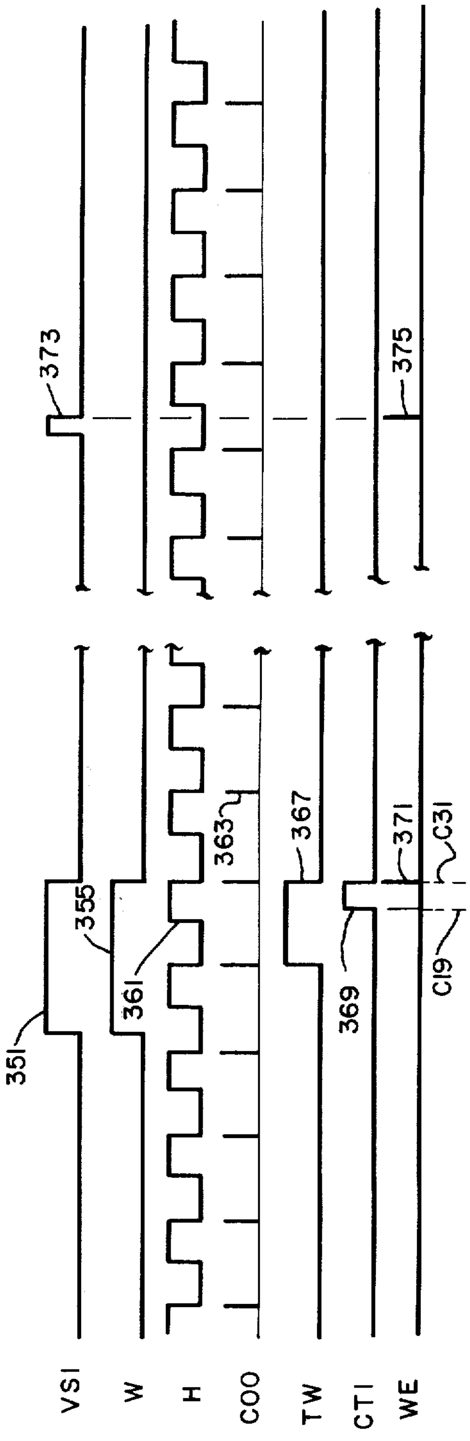
FIG. 16 illustrates waveforms useful in explaining the operation of the switching control circuit of FIG. 15.

A careful examination of the waveforms in FIG. 16 will disclose that the first negative-going transition of the H waveform 361 after the start of the W waveform 355 will initiate the TW waveform 367. As noted previously, the C00 count of the timing gates circuit 359 is developed at the time of each negative-going transition of the H waveform 361. The counts C01 through C31 will then be developed by the circuit 359 before the next negative-going transition of the H waveform 361. When a count of C19 is reached by timing gates 359, it will cause the transmit interval generator 357 to start the CTI interval. Since the CTI interval 369 is terminated at the time of the following C00 count, there are 13 bits of information that can be transmitted as the channel switching code. If additional bits of information were desired, the CTI interval could be started at an earlier count than C19.

Figure 17:
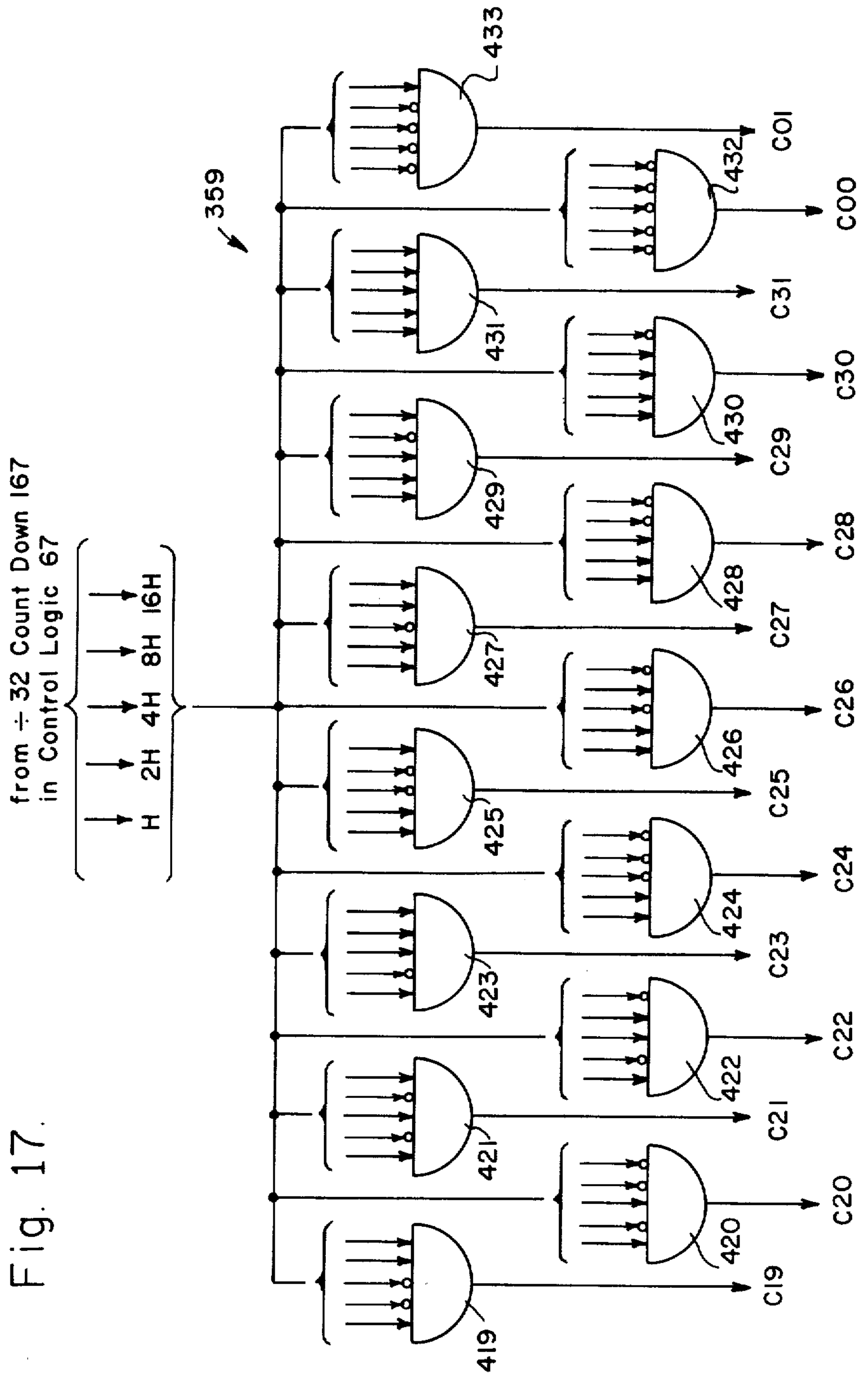
FIGS. 17, 18, 19 and 20 respectively illustrate block diagrams of the timing gates, inhibit circuit, transmit interval generator and word formatter of FIG. 15.

FIG. 17 discloses one mechanization of the timing gates 359 for developing the counts C19 through C31 and C00 and C01. The 16H, 8H, 4H, 2H and H timing signals from the countdown 167 in the Control Logic 67 are all applied to each of AND gates 419 through 433. The inputs to each of the AND gates 419 through 433 are selectively inverted to produce a 1 state output associated with its count when the countdown 167 reaches the corresponding count. For example, in order for the AND gate 419 to develop a 1 state output when the countdown 167 reaches 19 (C19), the 2H and 4H inputs of the AND gate 419 are inverted. This means that the binary count being applied to the inputs of the AND gate 419 are 10011, with the most significant bit being on the left and the least significant bit being on the right. The binary count of 10011 corresponds to a count of 19 from the countdown 167. In a like manner, the inputs to the remaining AND gates 420 through 433 are selectively inverted to get the desired count, in a manner well-known in the art.

Figure 18:
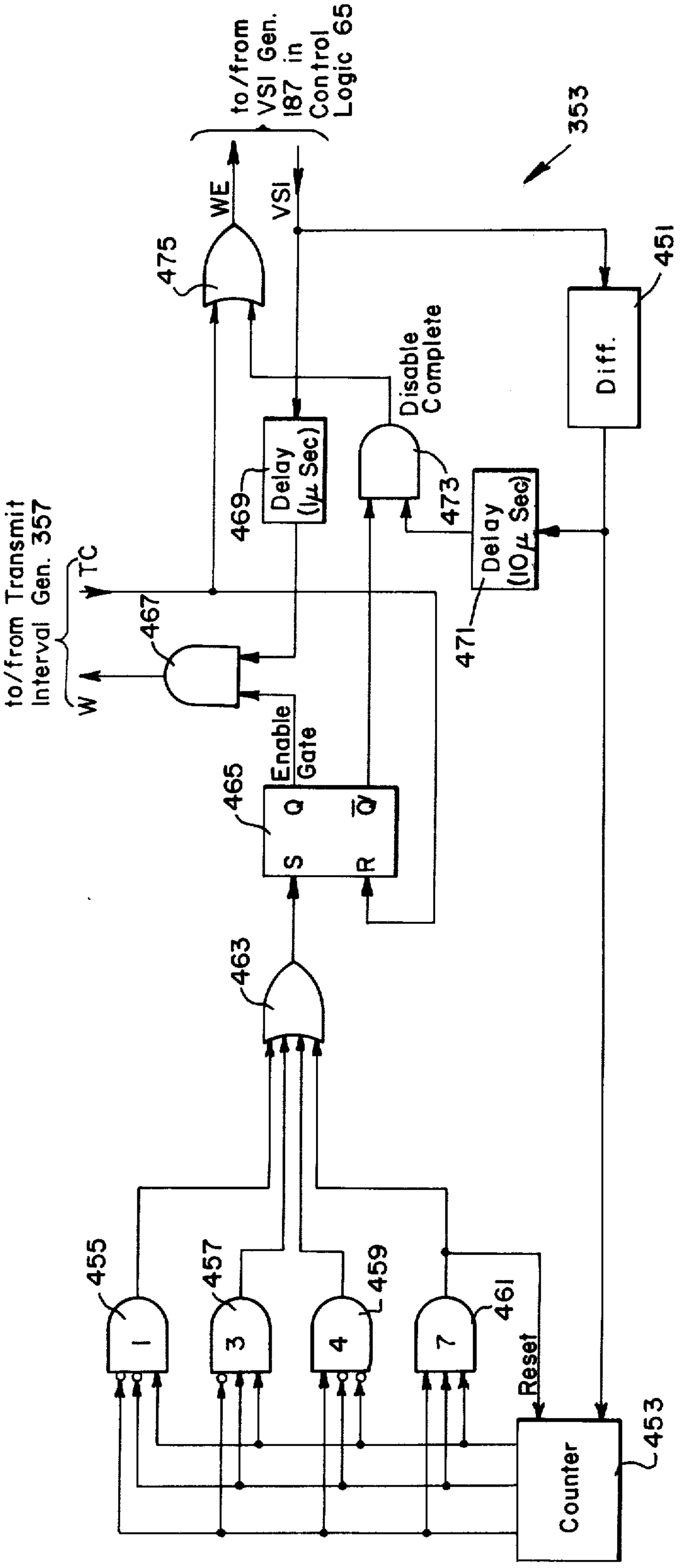

The inhibit circuit 353 in the switching control 69 will now be described by referring to FIG. 18. The VSI signal from the VSI generator 187 in the Control Logic 65 is differentiated by a differentiator 451 before it is applied to a counter 453. The counter 453 is a three bit counter which counts the number of VSI signals that have occurred up to a binary count of seven before it cyclically repeats its count. The three bit output from the counter 453 is applied to AND gates 455, 457, 459 and 461. The AND gates 455, 457, 459 and 461 have their inputs selectively inverted, in a similar manner to that discussed in relation to FIG. 17, such that they respectively produce 1 state outputs when the count of the counter 453 goes to 1, 3, 4, or 7. For example, the AND gate 455 inverts the most significant bit and second most significant bit from the counter 453 at its inputs, while the AND gate 461 does not invert any of the output bits of the counter 453. The outputs of the AND gates 455, 457, 459 and 461 are applied to an OR gate 463. The counter 453, AND gates 455, 457, 459 and 461 and the OR gate 463 function to supply a 1 state signal to the set side of a flip-flop 465 each time that the count of the counter reaches 1, 3, 4 or 7. It should be understood that these circuits could have been mechanized in a different counts or a larger or smaller number of counts of the counter 453 being utilized to set the flip-flop 465.

The flip-flop 465, therefore, has two modes of operation. A first mode occurs when it is set, while a second mode occurs when it is in a reset condition.

Assume that the counter has reached one of the 1, 3, 4, or 7 counts, thereby causing the OR gate to set the flip-flop 465. In its set condition the Q output of the flip-flop 465 changes to a 1 state, which is applied to one input of an AND gate 467. The output of the AND gate 467 is therefore determined during this first mode of operation by the binary state of its second input. At the same time that the VSI signal was being applied to the differentiator 451 it was also being applied through a one microsecond delay 469 before it was applied to the second input of the AND gate 467. The delay 469 is inserted to allow the differentiated leading edge of the VSI signal to be counted by the counter 453 and to allow sufficient time for the AND gates 455, 457, 459 and 461, the OR gate 463 and the flip-flop 465 to function before the VSI signal is applied to the second input of the AND gate 467. Since, under the facts given, the flip-flop 465 is in a set condition at the time that the VSI signal is applied to the AND gate 467 the AND gate 467 will develop and apply the W (window) gate (waveform 355) to the transmit interval generator 357 to allow it to initiate its operation.

The differentiated VSI signal from the differentiator 451 is also applied through a 10 microsecond delay 471 to one input of an AND gate 473. The $\overline{Q}$ output of the flip-flop 465 is applied to a second input of the AND gate 473. The output of the AND gate 473 is coupled to a first input of an AND gate 475. Since the flip-flop 465 is in a set condition, its $\overline{Q}$ will be in a 0 state, thereby disabling the AND gate 473 during this first mode of operation.

After the transmit interval generator 357 has completed its operation, it applies the TC (transmission complete) signal to the reset side of the flip-flop 465 to reset the flip-flop 465 and thereby disable the AND gate 467. The TC signal is also applied to a second input of the OR gate 475. The output of the OR gate 475 is the WE signal shown in the waveform 371. This WE signal is applied to the VSI generator 187 in the control logic 65 to terminate the VSI signal therefrom.

In the second mode of operation of the flip-flop 465, the leading edge of a VSI signal such as shown in the waveform 373 causes the count of the counter 453 to be at some count other than 1, 3, 4, or 7. As a result, none of the AND gates 455, 457, 459 and 461 develops an output to set the flip-flop 465. The flip-flop 465 therefore remains in its reset condition, with its Q output being in a 0 state to disable the AND gate 467 to prevent the generation of a W pulse. However, its $\overline{Q}$ side is in a 1 state which enables the AND gate 473 to pass the delayed leading edge of the VSI signal through the OR gate 475 to the VSI generator 187 to terminate the VSI signal.

It should be mentioned at this time that the VSI signal from the control logic 65 occurs at a 60 cycle frequency. As a result, the illustrated scrambling system operates at a maximum 60 cycle rate when not inhibited. However, if it is desired to increase the scrambling rate of the system, a horizontal sync pulse from the control logic 65 could have been used as a VSI source. In this event the circuitry of FIG. 18 would have to be modified to increase the size of the counter 453, the number and/or size of the AND gates 455, 457, 459 and 461 and the number of inputs to the OR gate 463. The principles, however, of this invention are equally applicable to either mechanization.

Figure 19:
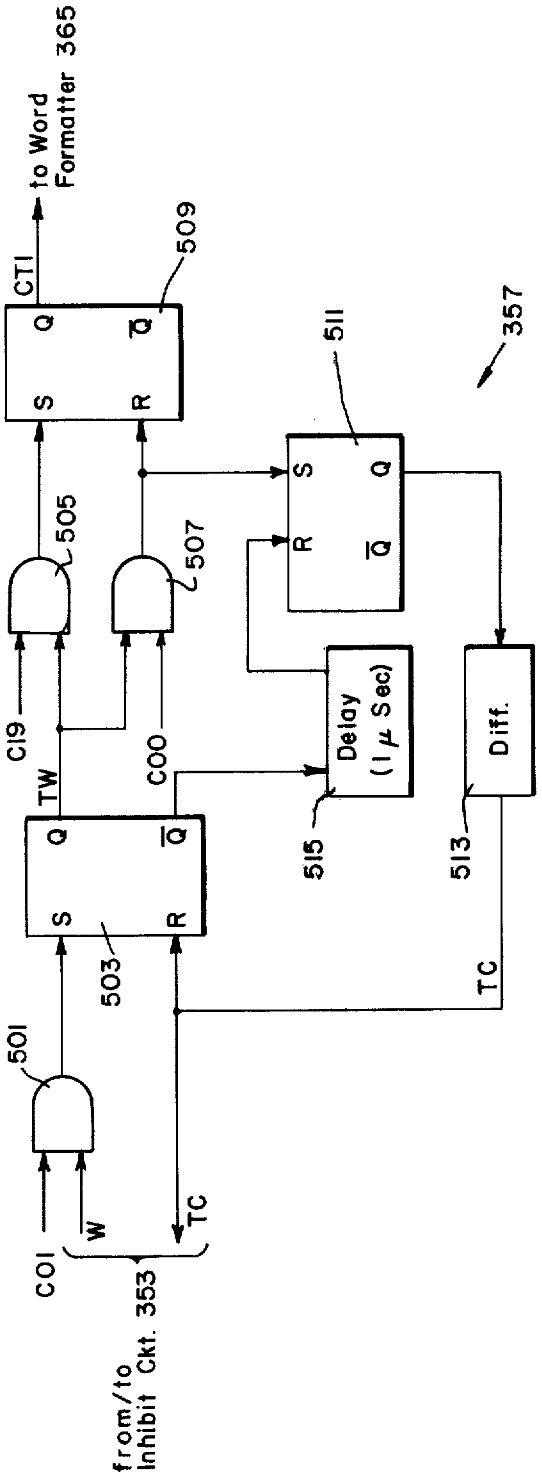

The transmit interval generator 357 is illustrated in FIG. 19. The basic purpose of the generator 357 is to line up the channel switching code, that is to be transmitted, with the horizontal sync rate. One full horizontal (H) line is required to assure that the switching code word does not get chopped off.

The application of the window (W) (waveform 355) to an AND gate 501 indicates to the transmit interval generator that the system wants to switch programs A and B into the opposite ones of channels X and Y and the system is not inhibited. Upon the application of the W waveform 355 from the inhibit circuit 353, the C01 output of the AND gate 433 in timing gates 359 is allowed to pass through the AND gate 501 to set a flip-flop 503. In its set condition the Q output of the flip-flop 503 develops the TW (transmit window) shown in the waveform 367 in FIG. 16. This TW signal is applied to AND gates 505 and 507.

The following 19 count (C19) pulse from the AND gate 419 (FIG. 17) passes through the AND gate 505 to set a flip-flop 509. The setting of the flip-flop 509 causes the CTI (code transmit interval) waveform 369 to be developed at the Q output of the flip-flop 509. This CTI signal is applied to the word formatter 365 in the switching control 69 to enable the word formatter 365 to initiate the generation and transmission of the channel switching code. At the completion of the channel switching code, which occurs at the start of the following zero count or C00 waveform 363, the C00 pulse 363 is passed through the AND gate 507, previously enabled by the TW waveform 367, to reset the flip-flop 509 to terminate the CTI waveform 369 and end the code transmission.

The output of the AND gate 507, which is used to reset the flip-flop 509, is also used to set a flip-flop 511. The 1 state Q output from the flip-flop 511 is then differentiated by a differentiator 513 to develop the TC (transmission complete) signal which is applied to the inhibit circuit 353. This TC signal, it will be recalled, is used to generate the We signal to terminate the VSI signal. In addition, the TC pulse is also used to reset the flip-flop 503 to terminate the TW waveform 367. The 1 state output of the $\overline{Q}$ side of the now reset flip-flop 503 is delayed 1 microsecond by a delay line 515 before it resets the flip-flop 511. The delay line 515 is inserted so that the flip-flop 511 is not reset unit 1 microsecond after the flip-flop 503 is reset. This assures an adequate length of time for the generation of the TC pulse. The flip-flops 503, 509 and 511 remain in their reset conditions until the operation of the transmit interval generator 357 is again initiated by the application of the following W gate 355 to the AND gate 501.

Figure 20:
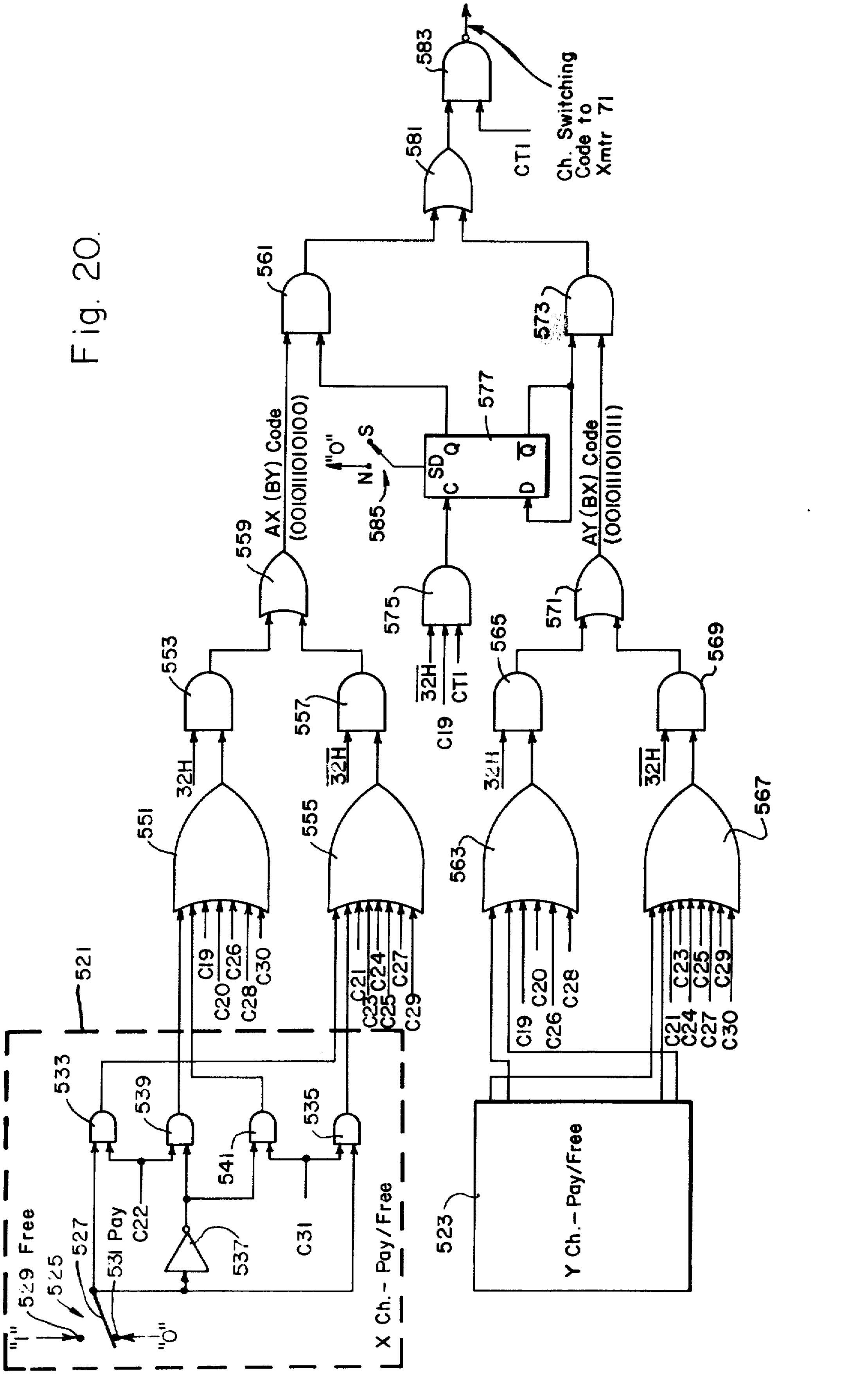

Each of the exemplary channel switching codes, 0010111010100 and 0010111010111, utilized in the implementation of the word formatter 365 shown in FIG. 20 is 13 bits in length. These 13 bits respectively occur during the period of time encompassed by the counts C19 through C31 from the timing gates 359. Furthermore, these 13 bits comprise three start-of-message (SOM) bits, four program bits, five channel bits and one parity bit.

The three start-of-message bits (001) are used to prepare each of the Manchester decoders 79 and 111 (FIG. 4) to process the following ten bits. Without the correct start-of-message bits (001), a Manchester decoder will not process any subsequent bits.

The parity bit is utilized to make the 10 bits following the three SOM bits have an odd parity to improve the validity of the system operation. A parity check of these 10 bits in a code or message will be discussed later.

The first four bits of the five channel bits identify which pair or group of adjacent television channels is being used to scramble the associated television programs. The fifth bit of the five channel bits identifies the channels on which the programs are appearing. For example, if the fifth channel bit is in a 0 state, program A is on channel X and program B is on channel Y. In a like manner, if the fifth channel bit is in a 1 state, program A is on channel Y and B is on channel X.

The four program bits disclose program information about the television channel selected by a subscriber. The first program bit in a code provides information on whether the associated channel is a free channel or a pay channel. If the first program bit is a 1 state signal, the associated channel is a free TV channel which does not require that a subscriber pay a fee to view the program associated therewith in a unscrambled condition. On the other hand, if the first program bit is a 0 state signal, the associated channel is a pay TV channel which requires the payment of a fee by the subscriber before the program associated therewith can be unscrambled. The determination as to whether the first program bit is a 0 state (pay TV) or a 1 state (free TV) is made by the CATV operator at the head end in accordance with a prearranged schedule. The remaining three program bits disclose the cost or fee required to watch the pay TV channel associated therewith. Combinations of program bits of 001, 011 and 111 respectively indicate fees of one, two or three units. A unit may have a higher price level for one type of pay TV program than for another. For example, a unit have a price level of $0.50, $1.00, $1.50 or any other predetermined dollar amount.

It should be noted at this time that, since the first program bit will be changed by the CATV operator upon the changeover from a pay TV program to a free TV program, the parity bit must also be changed to retain the odd parity in the code. The circuitry for accomplishing this capability is shown in the X and Y channel - pay/free circuits 521 and 523 of the word formatter 365 shown in FIG. 20. Since both of the circuits 521 and 523 are identical in structure and operation, only the X channel - pay/free circuit 521 will now be discussed in detail.

A switch 525, having a movable arm 527 which can be positioned to either of two fixed contacts 529 and 531, is located at the head end site and controlled by the CATV operator. The outputs from 1 state and 0 state sources (not shown) are applied to the fixed contacts 529 and 531, respectively. When the movable arm 527 is positioned to make contact with the fixed contact 529 ("free" TV position), the first program bit related to the X channel will indicate that a free unscrambled TV program can be viewed on the X channel. However, when the movable arm 527 is positioned to make contact with the fixed contact 531 ("pay" TV position), the first program bit related to the X channel will indicate that a pay TV scrambled program can be viewed on the X channel, unless the subscriber pays the requested fee to unscramble that program.

With the switch 525 being in its "pay" TV position, 0 state signal is applied through the movable arm 527 to disable AND gates 533 and 535 and through an inverter 537 to enable AND gates 539 and 541. The count C22 from the timing gates 359 (FIG. 17) is applied to second inputs of the AND gates 533 and 539. Also, the count C31 from the timing gates 359 is applied to second inputs of the AND gates 535 and 541. It should be recalled that it is during the counts C22 and C31 that the first program bit and the parity bit respectively occur. As a result, the AND gates 533 and 539 develop information at their outputs to indicate whether channel X is a pay or free channel for the reception of program A. In addition, the AND gates 535 and 541 develop information at their outputs to keep the parity of the code right. In the implementation shown in FIG. 20, the X channel pay/free circuit 521 is shown in the pay TV state in conformance with the previous discussion.

Since the AND gates 533 and 535 were disabled by 0 state inputs from the switch 525 while the AND gates 539 and 541 were enabled by 1 state inputs from the inverter 537, only the AND gates 539 and 541 will develop 1 state outputs during the times of the C22 and C31 counts, respectively. If, however, the switch 525 were placed in its "free" TV position, only the AND gates 533 and 535 would develop 1 state outputs during the times of the C22 and C31 counts, respectively.

The remaining circuits in the word formatter 365 will now be discussed. It should be recalled that the word formatter 365 utilizes the C19 through $\overline{C31}$ outputs from timing gates 361 (FIG. 17), the 32H and $\overline{32H}$ outputs from the VCO circuit 163 (FIG. 7) and the CTI output from transmit interval generator 357 (FIG. 15) to generate the channel switching code which is applied to code transmitter 71 (FIG. 4). Furthermore, it should be realized that the implementation of FIG. 20 for generating the codes utilized by the code transmitter 71 is for illustrative purposes only and that the word formatter 365 could be mechanized in any desired manner to generate more complex codes to identify one or more subscriber terminals, a group of subscriber terminals, or the hour, day and year that a particular program is being transmitted, or to supply any other useful information to the subscribers.

In the specific mechanization of the word formatter 365 shown in FIG. 20, one of two words will be utilized as the channel switching code. As discussed previously, when it is desired to transmit program A on channel X and program B on channel Y, the channel switching code 0010111010100 will be transmitted. Also, when it is desired to transmit program A on channel Y and program B on channel X, the channel switching code 001 0111010111 will be transmitted. Each 0 state in each code will be defined as a signal in phase with the 32H output from the VSO circuit 163, while each 1 state signal will be defined as being in phase with the $\overline{32H}$ output from the VSO circuit 163.

The 0010111010100 or AX (BY) code will be generated in the following manner. The C19, C20, C26, C28, and C30 counts from the timing gates 359 and the C22 and C31 counts from the circuit 521 are applied to an OR gate 551 which has its output coupled to an AND gate 553. The second input to the AND 553 gate is the 32H signal. The AND gate 553 will reproduce the 32H signal at its output only during the times that the C19, C20, C22, C26, C28, C30 and C31 counts are generated by the timing gates 359. The C21, C23, C24, C25, C27 and C29 counts are applied to an OR gate 555 which has its output coupled to an AND gate 557. It should be noted that no C22 and C31 counts are applied from the circuit 521 to the OR gate 555 at this time since the switch 525 of the circuit 521 is in its "pay" TV position. The $\overline{32H}$ signal is applied to a second input of the AND gate 557. The $\overline{32H}$ signal will be developed at the output of the AND gate 557 only during the times that the C21, C23, C24, C25, C27 and C29 counts are being developed by the timing gates 361. As a result of the above, and AND gate 553 will develop outputs which are in phase with $\overline{32H}$, and therefore the equivalent of binary 0 state signals, during the C19, C20, C22, C26, C28, C30 and C31 counts, while the AND gate 557 will develop outputs in phase with 32H, and therefore the equivalent of binary 1 state signals, during the C21, C23, C24, C25, C27 and C29 counts. The outputs of the AND gates 553 and 557 are applied to an OR gate 559 to develop the resultant AX(BY) code of 00101110100. This AX (BY) code is then applied to one input of an AND gate 561, which will be discussed later.

The AY (BX) code of 0010111010111 is developed in the following manner. The C19, C20, C26 and C28 counts from the timing gates 359 and the C22 count from the AND gate 539 in the circuit 523 are applied to an OR gate 563 which has its output coupled to one input of an AND gate 565. It should be noted that no C31 count is applied from the AND gate 535 of the circuit 523 to the OR gate 563 at this time since the switch 525 of the circuit 523 is in its "pay" TV position. The 32H signal is applied to a second input of the AND gate 565 enable the AND gate 565 to develop equivalent 0 state outputs during the C29, C20, C22, C26 and C28 counts in a manner similar to that described in relation to the AND gate 553. The C21, C23, C24, C25, C27, C29, and C30 counts from the timing gates 359 and the C31 count from the AND gate 541 in the circuit 523 are applied to an OR gate 567 which has its output coupled to a first input of an AND gate 569. The $\overline{32H}$ signal is applied to a second input of the AND gate 569 to enable the AND gate 569 to develop the equivalent 1 state outputs during the C21, C23, C24, C25, C27, C29, C30 and C31 counts in a manner similar to that described in relation to the AND gate 557. It should be noted that no C22 count is applied from the AND gate 533 of the circuit 523 to the OR gate 567 at this time since the switch 525 of the circuit 523 is in its "pay" TV position. The outputs of the AND gates 565 and 569 are applied to an OR gate 571 to enable the OR gate 571 to develop the AY(BX) code of 0010111010111 in a manner similar to that described in relation to the OR gate 559. The AY(BX) code is applied to one input of an AND gate 573.

The AND gates 561 and 573 are controlled so that only one of them will develop its associated code during the interval between C19 through C31. This control of the AND gates 561 and 573 is provided in the following manner. The $\overline{32H}$, C19 and CTI signals are applied to an AND gate 575 to enable the AND gate 575 to develop a 1 state signal at its Q output and a 0 state signal at its $\overline{Q}$ output during the positive-going alternation of the signal $\overline{32H}$ during the C19 count if a CTI signal is being generated. Each time that the AND gate 575 develops a 1 state output it clocks a D flip-flop 577, causing its Q side to change its output state. The flip-flop 577 is mechanized such that its $\overline{Q}$ output is coupled to its D input. In this manner the output state of the $\overline{Q}$ side of the flip-flop 577 will be transferred to the output state of the Q side of the flip-flop at each time that the flip-flop 577 is clocked.

The Q and $\overline{Q}$ outputs of the flip-flop 577 are applied to second inputs of the AND gates 561 and 573, respectively. The binary state of the Q output of the flip-flop 577 determines which one of the two codes AX(BY) and AY(BX) is to be transmitted. When the Q output of the flip-flop is in a 1 state the AND gate 561 is allowed to develop the AX(BY) code. In a like manner when the Q output of the flip-flop 577 is in a 0 state the AND gate 573 is allowed to develop the AY(BX) code.

The outputs of the AND gates 561 and 573 are applied to an OR gate 581 which has its output coupled to a first input of a NAND gate 583. The CTI gate from the transmit interval generator 357 is applied to a second input of the NAND gate 583 to cause the NAND gate 583 to act like an inverter during the CTI period. At all other times, except during the CTI period, the NAND gate develops a 1 state output. The output of the NAND gate 583 is the channel switching code that is applied to the code transmitter 71.

If the position of the switch 525 in either (or both) of the circuits 521 and 523 is positioned to its "free" TV position, the binary states of all of the outputs of the associated one (or both) of the circuits 521 and 523 will be reversed. This will reverse the binary states of the channel switching code bits occurring during the C22 and C31 counts.

In an additional operational feature a switch 585 is coupled between the set-direct (SD) input of the flip-flop 577 and a 0 state source. The switch 585 as "N" and "S" switch positions and can be manually electronically controlled or controlled through an automatic sequencer to provide in the "N" switch position a normal (N), non-switching operation for one or more entire programs in a free television mode of operation or for part of a television program in a preview mode of operation or to provide in the "S" switch position (shown) the switching or scrambling (S) operation being described. In its "N" position a 0 state signal from a source is applied to the set-direct (SD) side of the flip-flop 577 to override the output of the AND gate 575 and maintain the Q output of the flip-flop 577 at a 1 state level. In this event the AX(BY) code will be the only channel switching code to be transmitted and hence no scrambling will occur.

Figure 21:
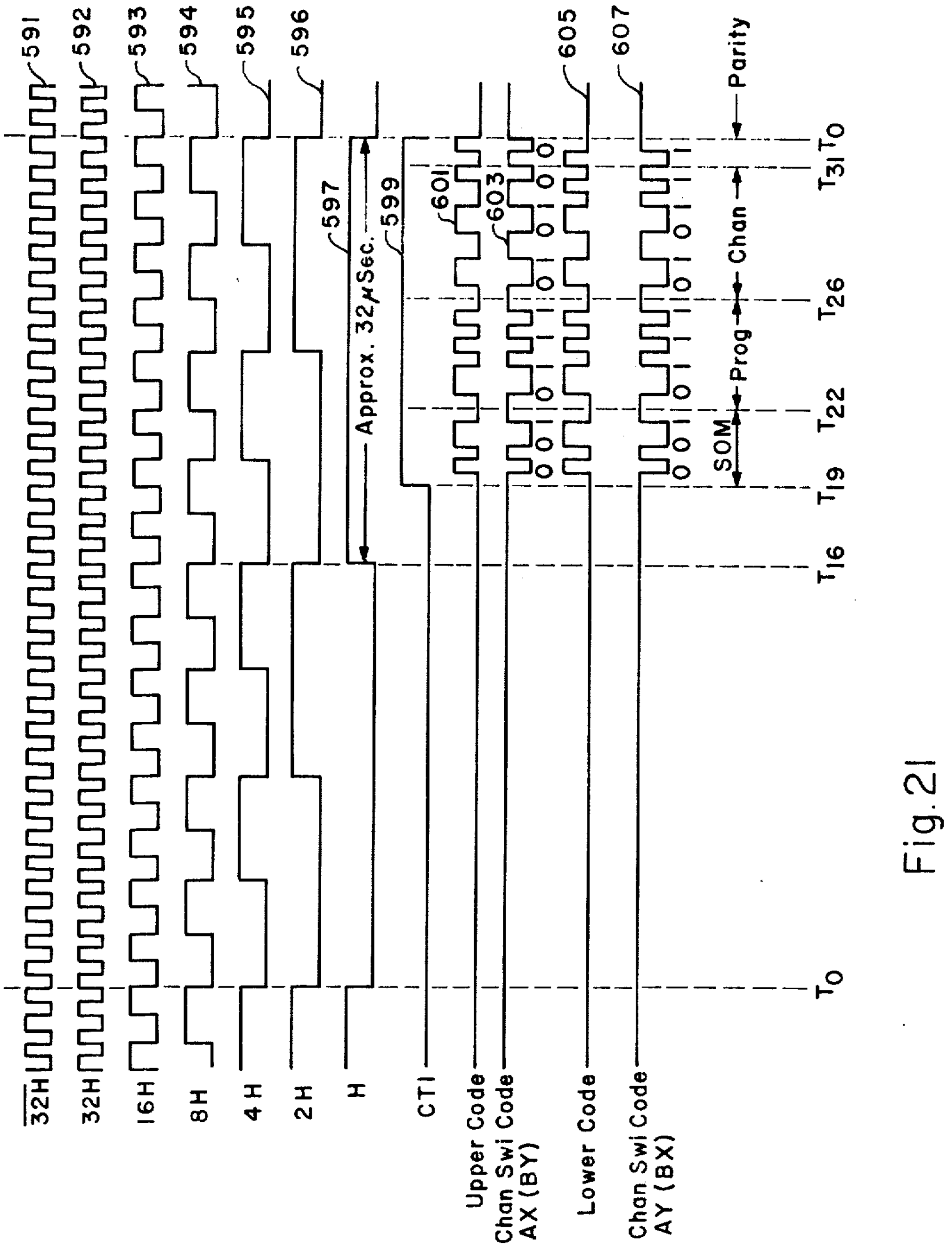
FIG. 21 illustrates waveforms useful in explaining the operation of the word formatter shown in FIG. 20.

Referring now to FIG. 21, various waveforms are illustrated to enable the reader to more clearly understand the operation of the word formatter 365. The timing and phase relationship of the $\overline{32H}$, 32H, 16H, 8H, 4H, 2H, and H signals are illustrated by the waveforms 591 through 597, respectively, particularly during the times $t_0$ through $t_{31}$ and from $t_{31}$ to $t_0$. The CTI gate as shown in the waveform 599 is 13 bits long (13 32H interpulse periods in duration), and occurs during the positive alternation of the H waveform 597 between times $t_{19}$ and the following $t_0$. It should be noted that the H waveform 597 has an interpulse period of approximately 64 microseconds and has a duration equal to 32 32H interpulse periods between the times $t_{19}$ and the following $t_0$. It is during the 13 bit intervals which occur from time $t_{19}$ to the following time $t_0$ that either one of the channel switching codes is generated.

The code AX(BY), or upper code, which is developed by the OR gate 559, is shown by waveform 601. When the Q output of the flip-flop 577 is in a 1 state, the upper code AX(BY) is inverted by the NAND gate 583 to develop the channel switching code AX(BY), which is shown by the waveform 603. In a like manner the lower code or AY(BX) code, which is developed by the OR gate 571 is illustrated by the waveform 605. When the Q output of the flip-flop 577 is in a 0 state, the lower code 605 is inverted by the NAND gate 583 to develop the AY(BX) channel switching code as illustrated by the waveform 607.

It should be noted at this time that it is desirable that the input to the Manchester decoder 79 (FIG. 4) be in a given logic state when no channel switching code is being received. As indicated in either of the waveforms 603 and 607, a positive state is illustrated during the intermessage period between $t_0$ and $t_{19}$ or during any other time that a code is not being transmitted. Furthermore, the word formatter 365 is mechanized in FIG. 20 so that each transition of a bit from a 0 state to a 1 state or from a 1 state to a 0 state occurs in the middle of each bit and not at the beginning of the bit. As a result, the transition at the middle of each bit indicates whether a binary 1 or a binary 0 is present. A transition from a 1 state to a 0 state indicates a 0 state bit, while a transition from a 0 state to a 1 state indicates a 1 state bit. Finally, as stated previously, the circuitry of FIG. 20 has been mechanized to provide an odd parity after the three start-of-message (SOM) bits. More specifically, the code shown in the waveform 603 has five 1 state bits after the three start-of-message bits, while the code shown in the waveform 607 illustrates seven 1 state bits after the three start-of-message bits.

As described in relation to FIG. 4, the channel switching code is transmitted by the code transmitter 71 on the carrier frequency $f_3$, frequency multiplexed onto the main trunk line 73 before transmission downstream, and is also applied through the tap p75 to the code receiver 77, demodulated by the code receiver 77, and applied to a Manchester decoder 79 which develops the NRZ data and downclocks (DCK) from the Manchester data.

Figure 22:
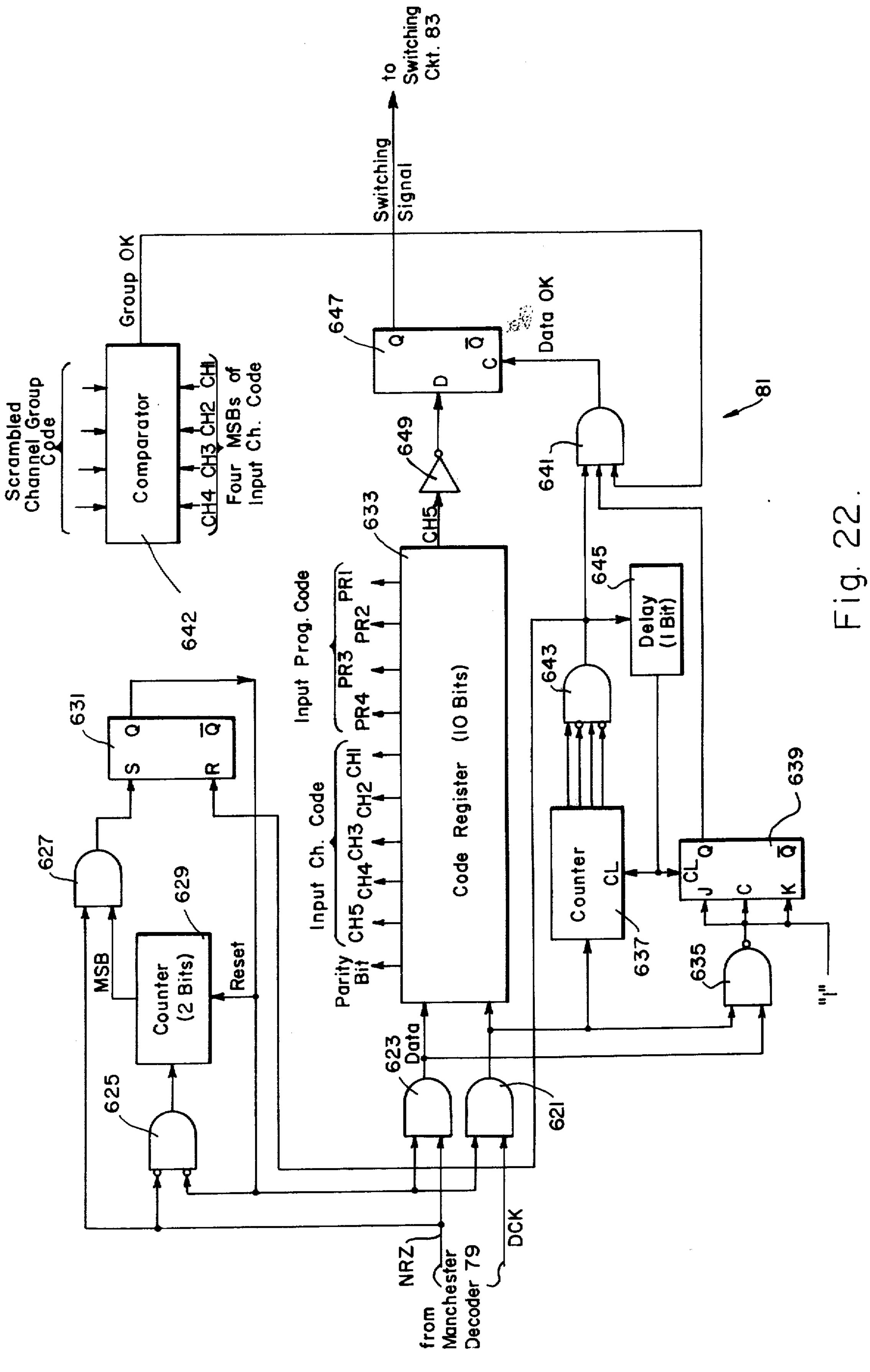
FIG. 22 illustrates a block diagram of the decoder 81 of FIG. 4.

Referring to FIG. 22 the decoder 81 will now be discussed in greater detail. The NRZ data and downclocks from the Manchester decoder 79 are applied to the decoder 81. More specifically, the downclocks are applied to one input of an AND gate 621 while the NRZ data is applied to one input of each of the AND gates 623, 625 and 627. Both inputs of the AND gate 625 are inverted in order to properly check the SOM bits. The output of the AND gate 625 is applied to a counter 639 which is two bits long. The most significant bit (MSB) from the counter 629 is applied to a second input of the AND gate 627. The output of the AND gate 627 is applied to the set side of the flip-flop 631 which, in turn, applies the output from its Q side to the counter 629 to the second input of each of the AND gates 621, 623 and 625. The AND gates 625 and 627, the counter 629 and the flip-flop 631 cooperate together to form circuitry for detecting the start-of-message (SOM) bits in the NRZ data code.

In operation, the Q output of the flip-flop 631 is in a 0 state during the period of time before NRZ data containing the channel switching code is applied to the decoder 81. As a result the AND gates 621 and 623 are disabled while the AND gate 625 is enabled to act as an inverter of the NRZ data. As specified before, the start-of-message bits are 001. The two 0 state bits in the SOM are both inverted by the AND gate 625 and counted by the counter 629. When the counter 629 reaches a binary count of two (10), the most significant bit is in a 1 state which enables the AND gate 627 to pass the 1 state bit of the SOM contained in the NRZ data to the set side of the flip-flop 631. This causes the Q output of the flip-flop 631 to change to a 1 state signal which resets the counter 629 to a binary count of 00, disables the AND gate 625 to prevent any more 0 state bits from being counted by the counter 629, and enables the AND gates 623 and 621 to respectively receive the NRZ data and downclocks. The outputs of the AND gates 623 and 621 are applied to a code register circuit 633 which is 10 bits in length. At each clock pulse the NRZ data bit appearing at the output of the AND gate 623 is clocked into the register 633. This enables the register 633 to store the 10 bits following the SOM bits in the channel switching code. These 10 bits are the four input program code bits (PR1 through PR4), the five input channel code bits (CH1 through CH5) and the parity bit, and appear at corresponding outputs of the code register 633 when the register 633 is filled.

The output of the AND gate 623 is also applied to one input of a NAND gate 635, while the downclocks at the output of the AND gate 621 are also applied to a counter 637 and to a second input of the NAND gate 635. The output of the NAND gate 635 is applied to a clock (C) input of a JK flip-flop 639 which has both of its J and K inputs coupled to a 1 state source. The flip-flop 639 is clocked to change the binary state of its Q output each time that the NAND gate 635 develops a 0 state output. At each positive-going portion of a downclock, with a downclock being similar to the $\overline{32H}$ signal, the output of the NAND gate 635 will change to a 0 state if the NRZ data is in a 1 state at that time. At the end of the ten bits which follow the three SOM bits in the code, the Q output of the flip-flop 639 will only be in a 1 state condition if there is an odd number of binary ones in the ten bits that follow the three SOM bits. The Q output of the flip-flop 639 is applied to a first input of an AND gate 641.

A comparator 642 is utilized to respectively compare the four MSBs of the channel group code (SCGC) of the pair of X and Y channels being scrambled with the corresponding four MSBs (CHI-CH4) of the input channel code from the code register 633 to determine whether the input code is the proper code word of group for the channel that is to be unscrambled. This scrambled channel group code can, for example, be hard-wired from some source (not shown) at the head end to correspond with switching code derived in FIG. 20. The comparator 642 can be any suitable comparator, such as a SN7485 which is manufactured by Texas Instruments, Incorporated and described between pages 9-286 and 9-288 of their CC-401 publication entitled *The Integrated Circuits Catalog For Design Engineers.* If the binary number of the four MSBs of the input channel code is equal to the corresponding binary number of the scrambled channel group code (SCGC), a 1 state "group OK" signal will be developed by the comparator 642. This "group OK" signal is applied to a second input of the AND gate 641.

Counter 637 counts the 10 downclocks which are passed through the AND gate 621 after the SOM. This counter 637 is four bits in length and has its four output terminals coupled to an AND gate 643. The AND gate 643 is mechanized so that the least significant bit (LSB) and second most significant bit (MSB) from the counter 637 are inverted at its corresponding input terminals. As a result, the AND gate 643 develops a 1 state output when the counter 637 reaches a counter of 10. This 1 state output is delayed by a delay line 645 for one bit time before it is used to clear the counter 637 and the flip-flop 639. During the time that the 1 state output of the AND gate 643 is being delayed, it is also applied from the AND gate 643 to a third input of the AND gate 641. It is therefore during this one bit period of time that the binary state of the Q output of the flip-flop 639 is sampled. If the Q output of the flip-flop 639 is in a 1 state condition, a 1 state data OK signal is generated by the AND gate 641, since the 1 state group OK signal is also being applied to the AND gate 641 at this time. This data OK signal is then applied to the clock input of a D flip-flop 647.

The least significant bit CH5, which is the switching bit of the channel bits from the register 633 is applied through an inverter 649 to the D input of the flip-flop 647. With the application of a data OK signal to its clock input, the Q output of the flip-flop 647 develops the switching signal which corresponds in binary state to the logical inversion of the switching bit CH5. This switching signal, as mentioned before, is used by the switching circuit 83 to switch the program A and B IF signals to opposite ones of the channel X and channel Y transmitters 85 and 87.

If, however, no data OK signal is developed by the AND gate 641, no switching signal will be developed by the flip-flop 647. This situation occurs when the flip-flop 639 has counted an even number of 1 state bits and its Q output is in a 0 state after the tenth NRZ bit following the SOM bits.

The 1 state output from the AND gate 643, which is developed when the counter 637 reaches a binary count of 10, is also used to reset the flip-flop 631 so that the Q output of the flip-flop 631 goes to a 0 state. Upon being reset the flip-flop 631 resets the counter 629 to a 00 count, disables the AND gates 621 and 623, and enables the AND gate 625 to receive NRZ data from the following code message. One bit time after the flip-flop 631 is reset, the delay 645 clears the counter 637 so that its output count is a binary 0000 and also clears the flip-flop 639 so that its Q ouput changes to a 0 state.

The switching circuit 83, to which the switching signal from the decoder 81 is applied, will now be described in more detail by referring to FIG. 23. The switching circuit 83, as mechanized in FIG. 23. The switching circuit 83, as mechanized in FIG. 23, utilizes diode networks 651, 652, 653 and 654 to perform the IF switching and application of different program IF signals to emitter follower circuits 655 and 656. Each of the diode networks 651, 652, 653 and 654 contains three diodes 659 through 661, whose anodes are connected to a common junction point 663. Also contained in each of the diode networks 651 through 654 is a resistor 665 coupled between the common junction point 663 and a positive 12 volt (+12V) source.

Each of the emitter follower circuits 655 and 656 contains a transistor 667 having a base which is coupled through a resistor 669 to a negative 12 volt (−12V) collector source, a collector coupled to a +5V source, and an emitter coupled through a resistor 671 to the −12V source. The junction of the base of the transistor 667 and the resistor 669 of the circuit 655 is coupled to a common junction point 673 which, in turn, is coupled to the cathode of each of the diodes 661 in the diode networks 651 and 652. The junction of the base of the transistor 667 and the resistor 669 of the circuit 656 is coupled to a common junction point 674 which, in turn, is coupled to the cathode of each of the diodes 661 in the diode networks 653 and 654. The output of each of the emitter follower circuits 655 and 656 is applied from the emitter through a capacitor 675 to the upconverter in its associated channel transmitter. More particularly, the output from the emitter follower circuit 655 is applied to the upconverter 27 in the channel X transmitter 21*a* (FIG. 2), while the output of the emitter follower circuit 656 is applied to the upconverter 29 in the channel Y transmitter 23*a* (FIG. 2).

In operation, the program A IF input is applied to a serially coupled capacitor 677 and resistor 679 combination with the opposite end of the resistor 679 being coupled to the −12V source. The program A IF input, which is developed across the resistor 679, is applied from the junction of the capacitor 677 and resistor 679 to the cathodes of the diodes 659 in the diode networks 651 and 653. At the same time the program B IF input is applied to a serially coupled capacitor 681 and resistor 683 combination with the opposite end of the resistor 683 being coupled to the −12V source. The program B IF input, which is developed across the resistor 683, is applied from the junction of the capacitor 681 and resistor 683 to the cathodes of the diodes 659 in the diode networks 652 and 654.

Figure 6:
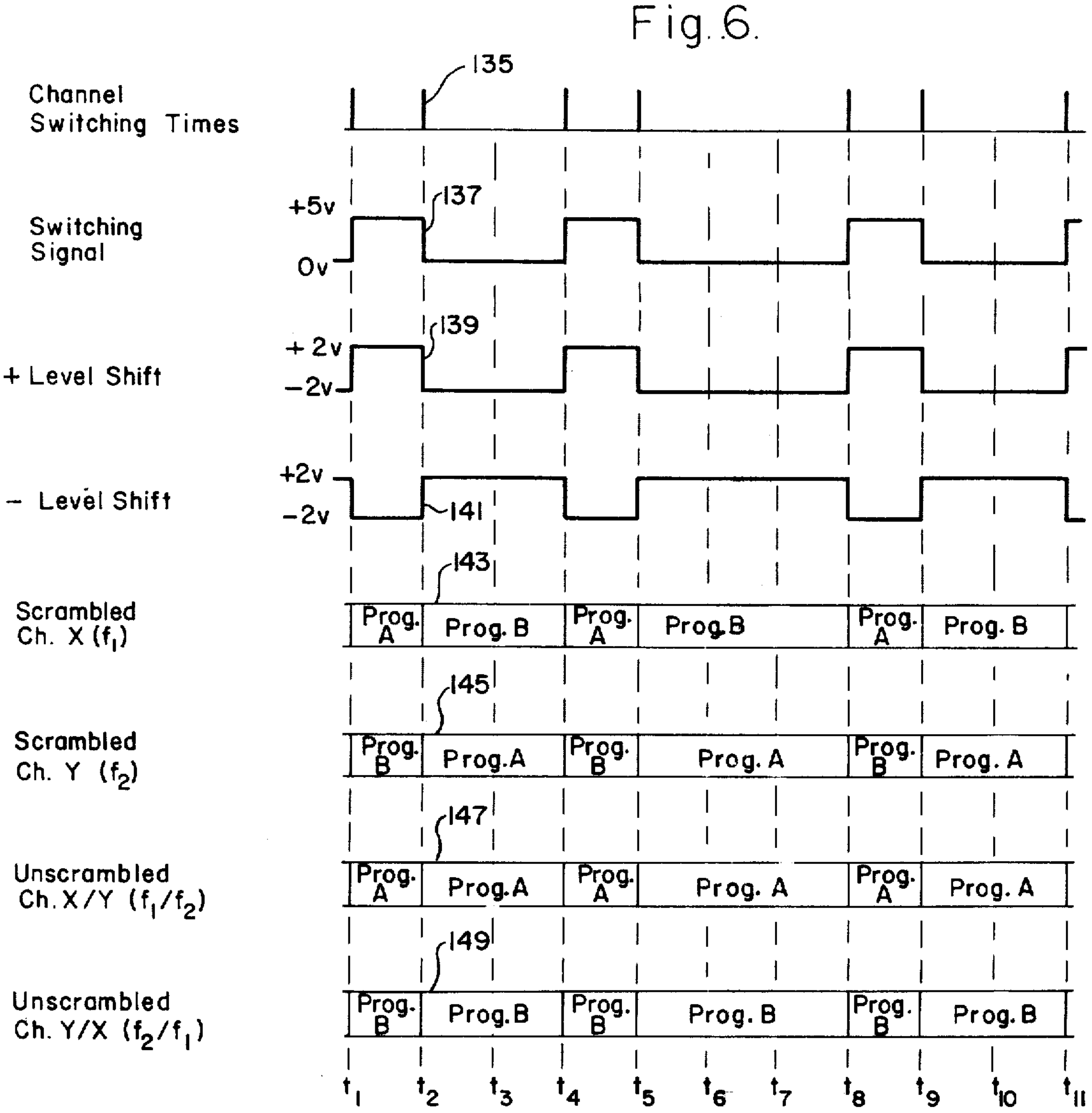
FIGS. 5 and 6 illustrate waveforms useful in explaining the operation of the system of FIG. 4.

The switching signal (waveform 137 in FIG. 6) from the decoder 81 (FIG. 22) is applied to a unity gain amplifier 685 and to a unity gain inverter 687 which respectively develop the positive and negative level shifts illustrated in the waveforms 139 and 141 of FIG. 6. These level shifts are required to selectively gate the diode networks 651–654 on and off. For illustrative purposes, assume that the switching signal is in a binary 1 state. The positive level shift from the amplifier 685 is therefore at a +2V level and the negative level shift from the inverter 687 is therefore at a −2V level. The −2V level from the inverter 687 is applied through the diode 660 to the common junction point 663 in each of the diode networks 652 and 653 to back-bias the diodes 659 and 661 in those diodes networks and thereby disable the diode networks 652 and 653. As a result the program A IF and the program B IF signals are prevented from passing through the diode networks 653 and 652, respectively. On the other hand, the +2 V signal from the amplifier 685 is applied to the cathodes of the diodes 660 in the diode networks 651 and 654, thereby back-biasing those diodes 660. As a result, the program A IF is allowed ot pass through the diodes 659 and 661 in the diode network 651 to the base of the transistor 667 in the emitter follower circuit 655. In a like manner, the program B IF is allowed to pass through the diodes 659 and 661 in the diode network 654 to the base of the transistor 667 in the emitter follower circuit 656. It can therefore be seen that when the switching signal is in a 1 state condition the program A IF is applied to the channel X transmitter 21*a* for upconversion to the $f_1$ frequency, while the channel B IF is applied to the channel Y transmitter 23*a* for upconversion to the $f_2$ frequency. In a similar manner it can be readily seen that when the switching signal is in a 0 state condition, the program A IF is applied to the channel Y transmitter 23*a*, while the program B IF is applied to the channel X transmitter 21*a*. It should be noted at this time, as discussed previously, that a 0 state switching bit CH5 causes a 1 state switching signal to be developed, while a 1 state switching bit CH5 causes a 0 state switching signal to be developed by the decoder 81 (FIG. 22).

It will be recalled that the $f_1$ and $f_2$ outputs of the channel X and Y transmitters 85 and 87 were applied to the frequency converter 97, along with other transmitted channels in the 54 to 270 MHz band, while the $f_3$ output of the code transmitter 71 was passed through the filter 95, demodulated by the code receiver 99 and decoded by a Manchester decoder 111 and a decoder 113, with the decoder 113 applying various signal information, including program and channel information to a program authorization unit 115. The authorization unit 115, utilized to enable a given subscriber to view a particular program, may be implemented in a variety of ways depending on the marketing and billing techniques employed. Essentially, each different implementation requires that the program authorization unit 115 receive a coded input signal which it would recognize as being a valid authorization of the individual subscriber to view a particular selected channel. Upon receipt of the signal, the program authorization unit 115 would allow subsequent unscrambling to occur on the selected channel.

Some of the specific methods for implementation and actuation of a program authorization unit are listed as follows:

a. By prearrangement with the CATV operator or seller of the pay TV program or programs, the subscriber may indicate his wish to buy either a single program, more than one program, or pay for the use of one or more pay television channels on a daily, weekly, monthly basis or any other time period basis. Such prearrangement can be made via telephone, mail or personal visit to the seller's location. In this case, a coded address would be sent by initiation of the seller via the coded channel ($f_3$) to all subscribers. Each subscriber would be assigned a unique coded address which would be electronically incorporated in the program authorization unit (PAU) by suitable wiring and digital logic. Upon receipt of a coded channel transmission containing this coded address, a coincidence indication is produced in the PAU. The address transmission will be followed by a coded transmission indicating "ON" or "OFF." The PAU will recognize the "ON" or "OFF" code immediately following reception and verification of the subscriber's address, and send a signal to the DC to enable it or diable it, depending on the purpose of the transmission, i.e., to start a program or to end it. Thus, the subscriber can be authorized to view programs on a given channel for a period determined by the seller. The billing method used here can be by cash or charge in advance of the program or billing subsequent to the program.

b. A second method of pay TV program purchase can be made by purchase of a card or ticket for the program from the seller. The card or ticket would be inserted into a suitable card reader mechanism included as part of the subscriber unscrambling circuitry. The card or ticket would be encoded such that the particular channel and program number would be entered by any one of various techniques such as punched holes, electrical contacts and interconnections, optical or chemical digital type indications. Suitable detection sensors and circuits would detect these indications and product a static digital output to the PAU. The PAU, upon receipt of the same channel and program number from the decoder 113, would detect this coincidence and initiate the unscrambling operation for the now-authorized selected channel.

Alternatively, the card or ticket would include the subscriber's unique address in addition to the channel and program number to restrict the use of the card to a particular subscriber terminal. In this case, in addition to the previous match of channel number, and program number, the card address must also match the subscriber's terminal address before it would initiate the unscrambling operation.

c. A third method of authorization and billing also uses a card or ticket. In this method, the card or ticket will carry a coded indication of a maximum amount of money, expressed in incremental steps. For example, the card may indicate a total of $10 recorded in 20 50-cent increments. The card reader would contain sensors to detect the total amount of money authorized and the number of incremental steps or credit remaining on the card. The PAU would periodically receive from the decoder 113 the amount of charge required to watch each pay TV program being transmitted at the particular time, and its associated channel number. The subscriber, having selected the desired channel for the program, would then actuate a push-button provided on his set to initiate purchase of a program. Actuation of the push-button would cause the PAU to furnish the digitally coded amount or fee for the program in question to the card reader unit. The card reader unit would then destroy a sufficient quantity of the incremental monetary units included in the card to equal the required fee for the program. The destruction of the charge units can be accomplished electrically by essentially burning out sensitive electrical conductors imbedded within the card, mechanically by punching holes or making other suitable mechanical alterations in the card, or by other techniques. The card reader will then read the amount of credit remaining in the card for subsequent purchases, and subsequently cancel the appropriate amounts of remaining credit as additional programs are purchased. A digital indicator can be included as a part of the subscriber terminal to indicate to the subscriber the amount of purchase in dollars and cents remaining.

Alternatively, the program charge may be regulated at the seller's option to charge for portions of the program sequentially. For example, if the total charge for a 60-minute program is $3.00, the charge code may be coded such that $0.50 is incrementally cancelled from the card for each 10-minute period of viewing.

d. A fourth method of authorization and billing does not require a card or other prior authorization. In this method, the subscriber is provided with a key switch, a pay TV pushbutton, and a channel selector switch. The subscriber is provided with a key to the key switch to prevent unauthorized usage of the subscriber's unscrambling equipment. To purchase a program, he must actuate his key switch, turn the channel selected to the desired channel and depress the pay TV pushbutton. This action causes an enabling signal to be sent to the PAU which, in turn, authorizes the PAU to initiate the unscrambling operation to permit the subscriber to view the desired program. In this method, which is primarily of practical use for cable television systems, the billing information is obtained by use of a two-way cable television (CATV) system.

In the above two-way cable television system, a local processing center (LPC) is located at the head end of the CATV network, and subscriber terminals are located in the subscriber's homes. The LPC periodically interrogates and receives digitally coded replies from each of the subscriber terminals. The replies are appropriately processed by a specially programmed computer at the LPC.

When the unscrambling system described herein is used as an integral component of an exemplary, two-way CATV system, the following sequence of events would ensue to provide a transfer of billing information to the seller. If a subscriber is authorized to receive a selected television program, the actuation of the pay TV button by the subscriber, in addition to initiating the unscrambling process, also transfers the subscriber's address and the number of the channel purchased to logic and memory circuits included in the subscriber terminal. The subscriber terminal, when interrogated by the LPC, furnishes the pay TV purchase information in reply. This information is processed by the LPC computer (which also adds to it the time of purchase) to prepare a complete billing recorded on magnetic tape or other form of storage as required for the actual preparation of bills.

The second implementation of the above mechanizations of program authorization units is now adopted as an exemplary type of program authorization unit in this application. It should, however, be realized that any of the other implementations described above, as well as other similar implementations, could have been used within the purview of this invention.

Figure 24:
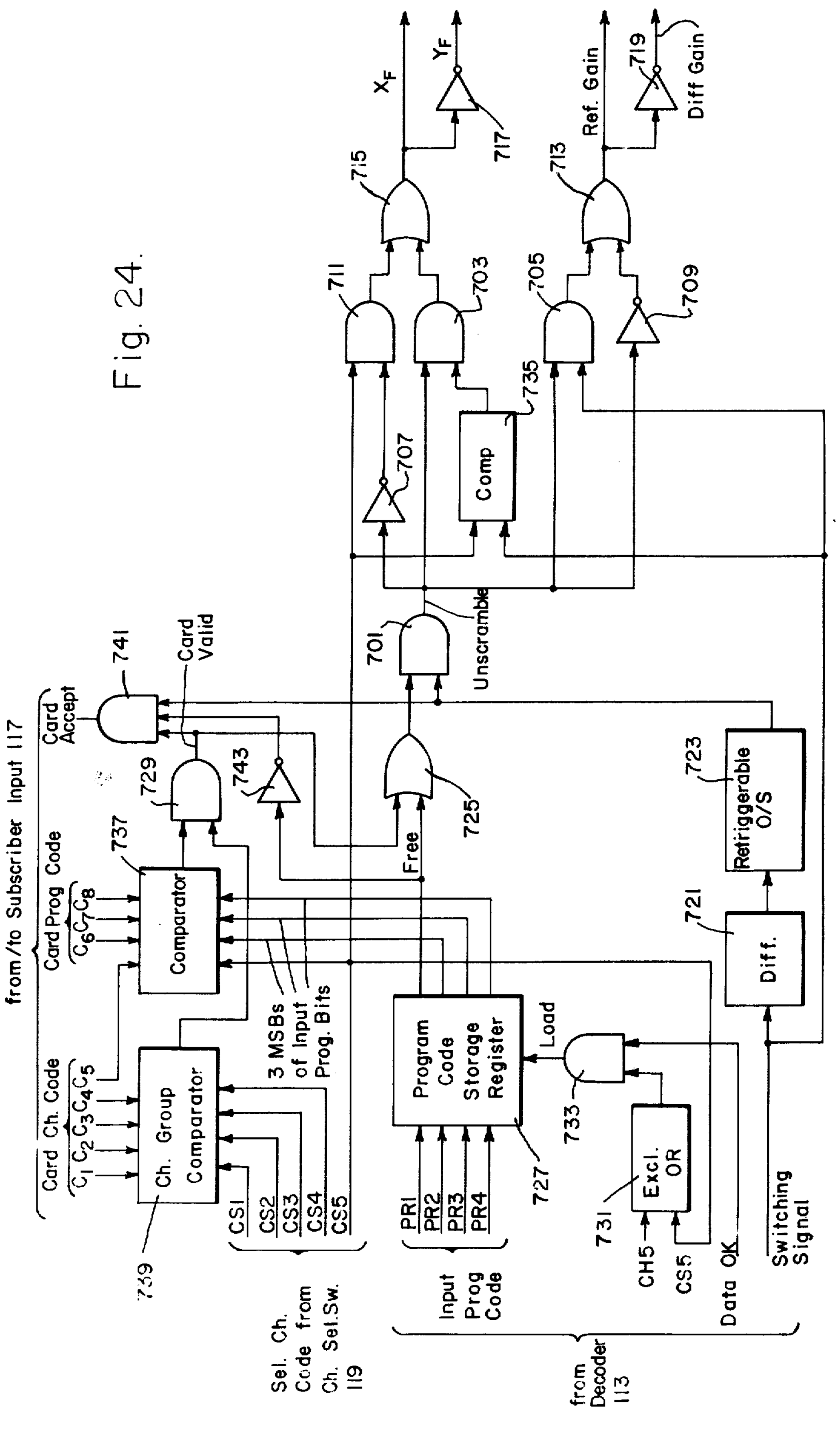
FIG. 24 illustrates a block diagram of the program authorization unit of FIG. 4.

Referring now to FIG. 24, the program authorization unit 115 will now be discussed. Basically, there are four different modes of operation associated with the program authorization unit 115. In a first mode of operation, the A and B programs are not scrambled. In a second mode of operation, the A and B programs are scrambled but one or both of the A and B programs is free. In this event, the program authorization unit 115 will unscramble the selected free program with no charge to the subscriber. In a third mode of operation, the A and B programs are acrambled and one or both of the programs are not free. In this event the subscriber must be authorized to receive the scrambled pay program before the unit 115 will unscramble the selected scrambled program. In a fourth mode of operation, the selected channel is scrambled and contains a pay program, but the subscriber has not paid for the program and therefore is unauthorized to receive it. In this event the selected channel will remain in its scrambled state. These four modes of operation will now be discussed.

In the non-scrambled first mode of operation, the output of an AND gate 701 is in a 0 state condition. The operating states of this AND gate 701 will be explained later in more detail. The output of the AND gate 701 is directly applied to AND gates 703 and 705 and inverted by logical inverters 707 and 709 before being respectively applied to inputs of an AND gate 711 and an OR gate 713. The output of the AND gate 705 is applied to a second input of the OR gate 713. Since the output of the AND gate 701 was stated to be in a 0 state condition during the first mode of operation, the AND gates 703 and 705 are disabled. The inversion of the 0 state output of the AND gate 701 by the inverter 707 before being applied to the AND gate 711 will enable the lower input of the AND gate 711. The output binary state of the AND gate 711 is therefore determined by the binary state of the CS 5 bit of the selected channel code that is applied to its upper input. A 1 state CS5 bit indicates that the subscriber has selected channel X, while a 0 state CS5 bit indicates that the subscriber has selected channel Y. In this first mode of operation, the output of the AND gate 711 will therefore be in a 1 state when the subscriber has selected channel X and in a 0 state when the subscriber has selected channel Y. The outputs of the AND gates 703 and 711 are applied to an OR gate 715. The output of the OR gate 715 is the $X_f$ signal. The $X_f$ signal is also inverted by a logical inverter 717 to develop the $Y_f$ signal. It can therefore be seen that when the X channel is selected, the $X_f$ signal is in a 1 state, and when the Y channel is selected, the $Y_f$ signal is in a 1 state. As a result, the output $X_f$ state of the OR gate 715 will indicate whether the X or Y channel is selected. It therefore follows that the output $X_f$ state of the OR gate 715 is determined by the binary state of the CS5 signal, since the AND gate 701 is developing a 0 state output at this time.

The output of the OR gate 713 is the reference (ref.) gain signal. This reference gain signal is also inverted by an inverter 719 to develop the difference (diff.) gain signal. It can therefore readily be seen that the output binary state of the OR gate 713 will determine whether a 1 state reference gain or a 1 state difference gain signal is being generated. Since it was stated that the output of the AND gate 701 was in a 0 state and that 0 state signal was inverted by the inverter 709, the output state of the OR gate 713 is in a 1 state. This means that in the non-scrambled first mode of operation the reference gain is always selected.

In the second mode of operation, while both of the A and B programs are scrambled, at least one of them is "free." Assume that the channel selected contains a free program. In this mode of operation the switching signal from the decoder 113 is differentiated by a differentiator 721 which has its output coupled to a retriggerable one shot multivibrator, such as a SN 74122, manufactured by Texas Instruments Incorporated and described between pages 6-79 and 6-83 of the Texas Instrument Handbook entitled *The Integrated Circuits Catalogue for Design Engineers.* The retriggerable one shot multivibrator 723 develops and applies a 1 state output to the lower input of the AND gate 701 when it senses a 0 to 1 transition at its input. The period during which its output will remain in a 1 state is much longer than the longest switching period encompassed while the switching signal changes from a 1 state to a 0 state and then back to a 1 state. As long as it sees a 0 to 1 transition, which occurs every other time that the switching signal changes its output state, the output state of the one shot 723 will remain in a 1 state condition. In the event that the switching signal stops switching for a longer period of time than the timing period of the one shot 723, the output of the one shot 723 will change to a 0 state to thereby cause the output of the AND gate to go to a 0 state. This would then cause the program authorization unit 115 to revert to the non-scrambled first mode of operation discussed above.

Since the second mode of operation is a scrambled mode of operation, the 1 state output of the one shot multivibrator 723 will enable the lower input of the AND gate 701. As stated previously, when the output of the AND gate 701 is in a 1 state the system will permit unscrambling to be accomplished. The upper input of the AND gate 701 is coupled to the output of a two-input OR gate 725. One input of the OR gate is coupled to a preselected one (PR1) of the four outputs of a program code storage register 727, while the other input to the OR gate 725 is coupled to the output of an AND gate 729. The program storage register 727 receives and stores the four bits PR1 through PR4 in the input program code. This input program code is loaded into the register 727 in the following manner.

Assume that when the subscriber has positioned the channel selector switch 119 to channel X, CS5 (the least significant bit of the selected channel code) is in a 1 state, and when he has positioned the switch 119 to channel Y the CS5 signal is in the 0 state. From our previous discussion of the formatting of a channel switching code in the switching control 69 (FIG. 15), any time a code it received in which the CH5 bit (the least significant bit of the input channel code) is equal to zero, it is telling the decoder 113 to put program A on channel X, to put program B on channel Y and that the program bits in the code are for program A. Therefore, when CH5 is in a 0 state and CS5 is in a 1 state, it is an operational requirement to allow the Data OK signal associated with that code to store the input program bits (PR1-PR4) in the register 727, since these bits contain information related to channel X. It can therefore be seen that when the binary states of CH5 and CS5 are different and a Data OK signal is generated, the register 727 will load the program bits PR1-PR4. This is accomplished by applying the CH5 and CS5 signals to an exclusive OR gate 731 which will only develop a 1 state output when its inputs are different. The output of the exclusive OR gate 731 is applied to one input of an AND gate 733. The Data OK signal is applied to a second input of the AND gate 733 and enables the AND gate 733 to generate a load signal at every Data OK time in which the inputs to the exclusive OR gate 731 are different. The load signal from the AND gate 733 is applied to the program code storage register 727 and enables it to load and store the input program code bits (PR1 through PR4) at this time.

Since the CH5 signal is changing its binary state each time the programs A and B are to be switched, the register 727 will only be loaded every other time. As a result, the information stored in the register 727 will only apply to the program associated with the selected channel. In a similar manner, when CH5 is in a 1 state condition and CS5 is in a 0 state condition, the PR1-PR4 bits being stored in the register contain information related to selected channel Y.

The register 727 can basically consist of four separate D flip-flops (not shown) to each data input of which is applied a separate one of the input program bits. The load signal from the AND gate 733 is applied to the clock inputs of each of the D flip-flops, while the appropriate associated input program code bits are respectively stored at corresponding Q outputs of the flip-flops.

If the Q output of the flip-flop to which the PR1 bit was applied changes to or remains in a binary 1 state after the Data OK signal is generated, the selected channel contains a free program. This 1 state "free" signal from the register 727 is applied through the OR gate 725 to the upper input of the AND gate 701. Since the programs A and B are being scrambled at this time, the switching signal continues to retrigger the one shot multivibrator 723 to apply a resultant 1 state output to the lower input of the AND gate 701. As a result, the output of the AND gate is in a 1 state condition. This enables the unscrambling process to occur.

The 1 state output of the AND gate 701 is inverted by the inverters 707 and 709 to disable the AND gate 711 and the lower input of the OR gate 713. The 1 state output from the AND gate 701, however, enables the upper input of the AND gate 703 so that the output state of the gate 703 is controlled by the output of a comparator 735 which is coupled to the lower input of the AND gate 703. It can be readily seen that if the output of the comparator 735 is in a 1 state, the $X_f$ signal is in a 1 state and channel X is selected. In a similar manner if the output of the comparator 735 is in a 0 state, a 1 state $Y_f$ signal is generated to show that channel Y is being selected. The comparator 735 compares the binary states of the CS5 signal and the switching signal. In its operation, if the CS5 and switching signals at its inputs are in the same binary state, a 1 state signal is produced at the output of the comparator 735 to develop the $X_f$ signal, and if they are in different binary states, a 0 state is produced at its output to develop the $Y_f$ signal. It can therefore be seen that if the CS5 signal is in a 1 state condition, this indicates that channel X has been selected and that the subscriber desires to receive program A, and vice versa. It should be recalled that when the switching signal is in a 1 state, program A is on channel X and program B is on channel Y. Also, when the switching signal is in a 0 state, program A is on channel Y and program B is on channel X.

It should also be recalled that it was shown that the output of the comparator 735 controls the output state of the OR gate 715. Therefore, when channel X is selected to cause CS5 to be in a 1 state condition, the output of the comparator 735, and hence $X_f$, will follow the binary state of the switching signal. In a like manner, when channel Y has been selected to cause CS5 to be in a 0 state condition, the output of the comparator 735, and therefore $X_f$, will hve the inverted binary state of the switching signal. By this means the program authorization unit unscrambles the scrambled A and B programs. However, since the binary state of the PR1 bit indicated that the program was free, no fee was charged for this unscrambling.

This 1 state output of the AND gate 701 also enables the upper input of the AND gate 705. The output state of the AND gate 705, and hence the binary states of the reference gain and difference gain signals, is controlled by the binary state of the switching signal during this second mode of operation. Therefore a 1 state switching signal will cause a 1 state reference gain signal to be generated, while a 0 state switching signal will cause a 1 state difference gain signal to be generated.

In the third mode of operation, the programs A and B are scrambled and the channel selected is not free. As a result, the program authorization unit 115 requires the verification of payment or of a commitment to pay before it will authorize the unscrambling process. In this mode of operation, the input program code bit PR1 that is stored in register 727 is in a 0 state to indicate that the program associated with the selected channel is not free. Therefore, the lower input of the OR gate 725 is in a 0 state. The output of the OR gate 725 is therefore determined by the binary state of its upper input signal which is being applied from the AND gate 729. The AND gate 729 has inputs coupled from the outputs of comparators 737 and 739. The channel group comparator 739 respectively compares card channel code bits C1 through C4 with the selected channel code bits CS1 through CS4 from the channel selector switch 119. If there is an exact comparison between the respectively compared corresponding bits, the comparator 739 will develop a 1 state signal which is applied to the lower input of the AND gate 729. The comparator 737 compares the card channel code bit C5 with the selected channel code bit CS5, and also respectively compares the card program code bits C6 through C8 with the input program code bits PR2 through PR4 in the register 727. If there is an exact comparison between the respectively compared corresponding bits, the comparator 737 will develop a 1 state output which will be applied to the input of the AND gate 729.

If both of the comparators 737 and 739 have exact comparisons, their 1 state outputs will enable the AND gate 729 to develop a "card valid" signal which is applied to the upper input of the OR gate 725 to initiate the unscrambling process, as discussed above with respect to the second mode of operation.

The "card valid" signal from the AND gate 729 is also applied to a first input of an AND gate 741. The stored 0 state input program code bit PR1 from the register 727 is inverted by a logical inverter 743 and applied to a second input of the AND gate 741. The output of the retriggerable one shot multivibrator 723, which is in a 1 state condition at this time, since the A and B programs are being scrambled, is applied to a third input of the AND gate 741. The three 1 state inputs to the AND gate 741 represent that the selected channel is scrambled and not free and that the subscriber has inserted a valid card into the subscriber input 117. In response to these three 1 state signals being applied to its inputs at this time, the AND gate 741 develops a "card accept" signal which is applied to the card reader in the subscriber input 117 to actuate a destruct mechanism (not shown) which destroys the code bits on the card when the subscriber removes the card. This prevents the subscriber from using the card for subsequent programs.

In the fourth mode of operation, the programs A and B are scrambled, not free, and not authorized (by the generation of a "card valid" signal to indicate verification of payment). Therefore, the AND gate 701 is disabled by a 0 state output from the OR gate 725 to prevent the unscrambling operation. The selected channel therefore remains scrambled.

It should be noted at this time that each of the comparators 735, 737, and 739 are similar in structure and operation to the comparator 642 discussed in relation to FIG. 22.

Figure 25:
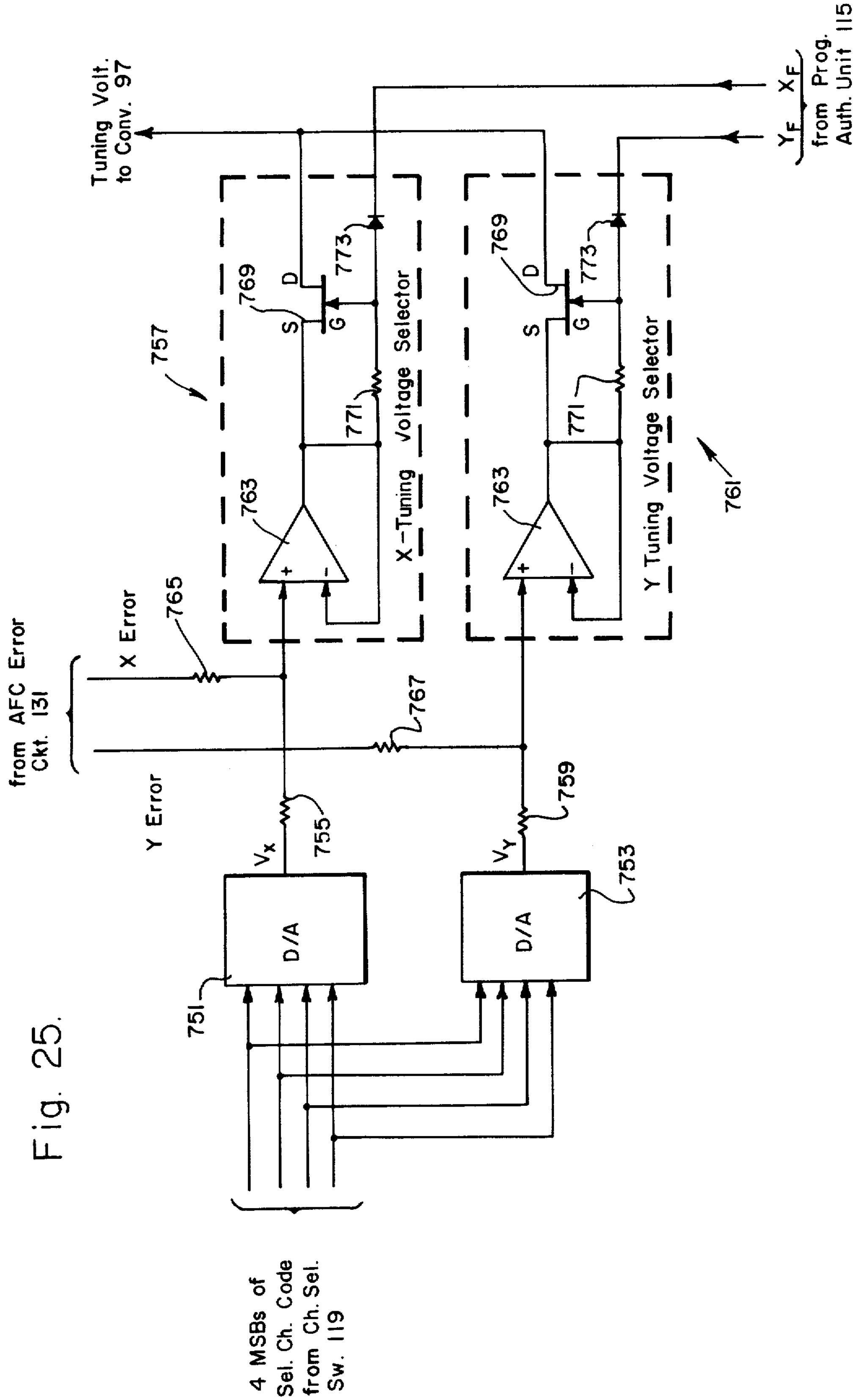
FIG. 25 illustrates a block diagram of the channel frequency select and switching circuit of FIG. 4.

Referring now to FIG. 25, the channel frequency select and switching circuit 121 (FIG. 4) will now be discussed. The four MSB's of the selected channel code from the channel selector switch 119 are applied to each one of digital to analog (D/A) converters 751 and 753. The D/A converters 751 and 753 are respectively programmed to develop a $V_x$ signal for the X channel and a $V_y$ signal for the Y channel in response to the four MSB's of a selected channel code group. Since four MSB's are utilized in the channel code group, any one of 16 different code groups could be selected. This means that 32 different transmission channels could be scrambled in pairs, for example, at the head end, with different $V_x$ and $V_y$ signals being utilized in each group.

The $V_x$ signal is for one of the two channels in the selected group while the $V_y$ signal is for the other channel in the selected group. The $V_x$ signal from the D/A converter 751 is applied through a resistor 755 to a channel X-tuning voltage selector circuit 757, while the $V_y$ output from the D/A converter 753 is applied through a resistor 759 to a channel Y-tuning voltage selector circuit 761 which is identical in structure and operation to the selector circuit 757. The $V_x$ signal is applied to the non-inverting input of an operational amplifier 763 in the selector circuit 757. The amplifier 763 is configured to operate as a voltage follower, and its output is coupled to its inverting input.

The channel X error signal from the AFC error circuit 131 is applied through a resistor 765 to the non-inverting input of the operational amplifier 763. The channel X error voltage acts to correct any inaccuracies in the $V_x$ output from the D/A converter 751. The channel Y error signal from the AFC error circuit 131 is applied through a resistor 767 to the non-inverting input of the operational amplifier 763 in the selector circuit 761 to correct for any inaccuracies in the $V_y$ signal. The output of the operational amplifier 763 is applied to the source (S) electrode of a field effect transistor (FET) 769 and is also applied through a pull-up resistor 771 to the gate (G) electrode of the FET 769. The pull-up resistor 771 functions to pull the gate potential up to approximately the source potential when the FET 769 is turned on.

It should be noted at this time that the FET 769, as well as the other FET's described in this application, are operated as switches, which are either turned "on" or "off." A FET is turned "on" by allowing its gate potential to be substantially equal to its source and drain potenitals. When a FET is turned "on," the internal resistance from its source to its drain is relatively low. The FET's illustrated in this application are turned "off" by making the gate negative in potential with respect to the source and drain voltages by applying a voltage to the gate which is equal to the "pinch off" voltage of the FET. When a FET is turned "off" its source to drain resistance is very high.

The drain (D) electrodes of the FETs 769 in the selector circuits 757 and 761 are coupled together to supply the tuning voltage to the frequency converter 97. An isolation diode 773 has its anode coupled to the junction of the resistor 771 and the gate electrode of the FET 769 in each of the selector circuits 757 and 761. The $X_f$ and $Y_f$ signals from the program authorization unit 115 are respectively applied to the cathodes of the diodes 773 in the selector units 757 and 761 to selectively turn "on" or "off" the FETs 769 in the selector units 757 and 761.

As discussed previously, when the $X_f$ signal is in a 1 state condition, the $Y_f$ signal is in a 0 state condition, and vice versa. Assume for purposes of explanation, that the $X_f$ signal is in a 1 state condition and that the $Y_f$ signal is in a 0 state condition. The 1 state $X_f$ signal back-biases the diode 773 in the selector circuit 757 and enables its associated FET 769 to pass the channel X tuning voltage at the output of the amplifier 763 in the selector circuit 757 to the converter 97. At the same time, the 0 state $Y_f$ signal passes through the diode 773 in the selector circuit 761 and turns "off" its associated FET 769 to prevent the channel Y tuning voltage at the output of the selector circuit 761 from passing to the converter 97. In this manner, the tuning voltage at the output of the selector circuit 757 allows the program appearing on channel X at that time to appear at the output of the converter 97. In a like manner, when $Y_f$ is in a 1 state condition and $Y_f$ is in a 0 state condition, the selector circuit 761 is allowed to pass the channel Y tuning voltage to the converter 97 so that the program appearing on channel Y at that time is allowed to appear at the output of the converter 97. At the same time the 0 state $X_f$ signal prevents the channel X tuning voltage from being applied to the converter 97.

Figure 26:
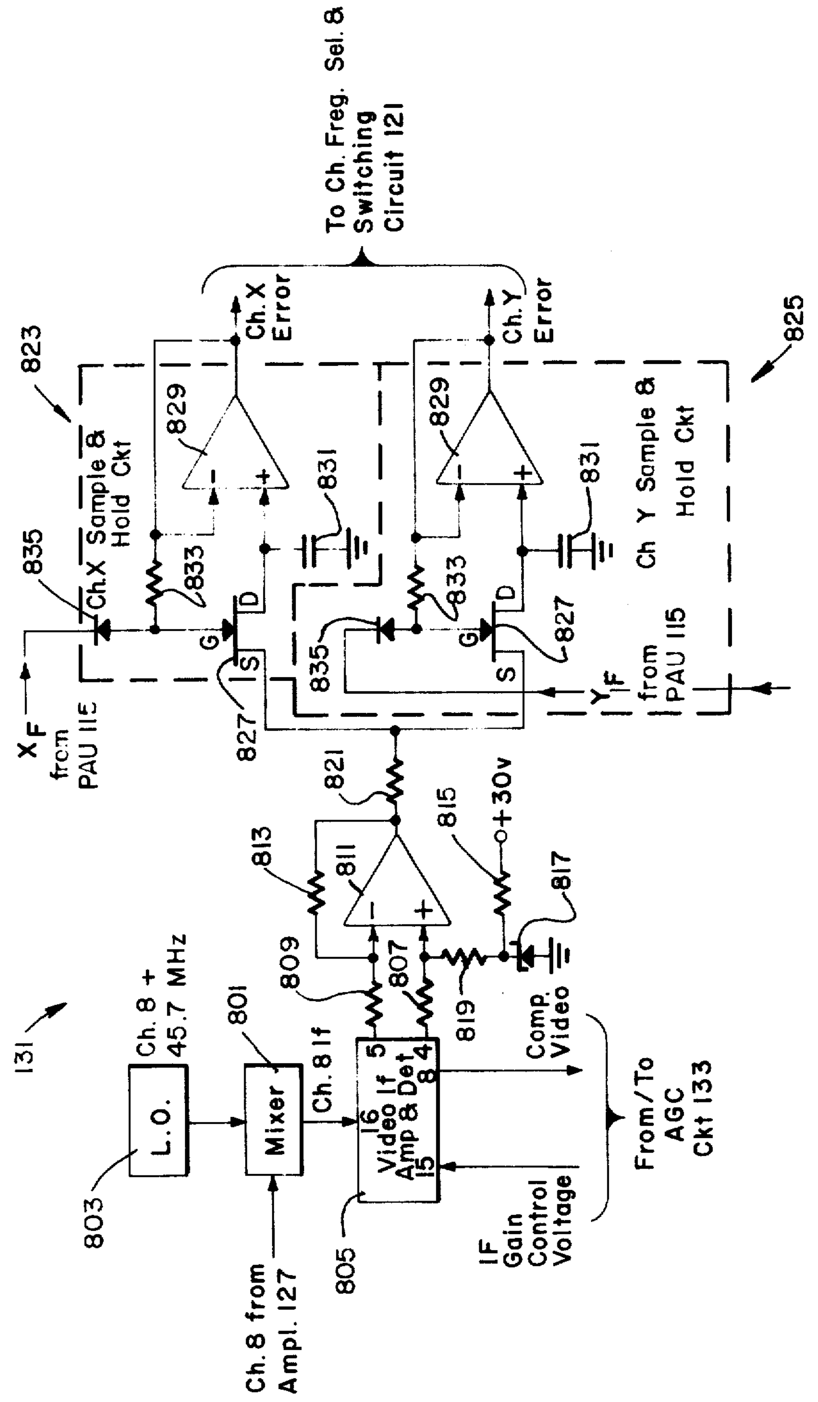
FIG. 26 illustrates a block diagram of the automatic frequency control (AFC) circuit of FIG. 4.

Referring now to FIG. 26, the AFC error circuit 131 will now be discussed. The basic function of this AFC error circuit is to selectively sample and hold the X and Y channel frequency error voltages. These channel X and Y error signals are selectively applied to the channel frequency select and switching circuit 121 to cause the circuit 121 to selectively develop the proper channel X and channel Y tuning voltages to precisely tune the frequency converter 97 so that the video carrier of the channel 8 output from the converter 97 is at precisely the same frequency regardless of whether the frequency converter 97 is selecting channel X or channel Y.

The channel 8 output from the amplifier 127 is applied to a mixer circuit 801 which heterodynes the channel 8 input with the output of a local oscillator 803. The local oscillator 803 is tuned to a frequency approximately 45.7 MHz above the video carrier frequency of channel 8. The output of the mixer 801 is the channel 8 IF which is applied to a conventional video IF amplifier and detector circuit 805. The amplifier and detector 805 utilized here will be the IF/AFT Module of RCA which has a stock number of 132586, although any other suitable video IF amplifier and detector circuit could have been utilized here.

The channel 8 IF signal is applied to pin 16 of the amplifier and detector circuit 805. The IF gain control voltage from the AGC circuit 133 is applied to pin 15 of the circuit 805. The level of this IF gain control voltage is controlled by the AGC circuit 133 such that approximately 6 to 8 volts peak-to-peak of composite video comes out of pin 8. It will be recalled that the composite video from the circuit 805 is utilized by the AGC circuit 133 to ultimately control the amplitude of the IF gain control voltage. The AGC circuit 133 will be discussed later in FIG. 27.

Under the above-described operational conditions, the differential voltage between pins 4 and 5 of the amplifier and detector circuit 805 is an indication of the extent to which the converter 97 is tuned off of the channel 8 video center frequency. For example, if pin 5 is positive with respect to pin 4, the converter is tuned to too high a frequency, and vice versa. The outputs from pins 4 and 5 are respectively applied through resistors 807 and 809 to the non-inverting and inverting inputs of an operational amplifier 811. The output of the amplifier 811 is coupled back to the inverting input through a resistor 813. A serially coupled resistor 815 and zener diode 817 combination is coupled between a positive 30 volt source and ground to enable the zener diode 817 to develop a reference voltage which is applied through a resistor 819 to the non-inverting input of the amplifier 811.

In operation, the amplifier 811 and the circuitry associated therewith enable the amplifier 811 to operate as a differential amplifier which amplifies the differential voltage between pins 4 and 5 of the amplifier and detector circuit 805 and level shifts this amplified differential voltage to a level determined by the zener diode 817 in a conventional manner.

The error signal at the output of the amplifier 811 is applied through an isolation resistor 821 to channel X and channel Y sample and hold circuits 823 and 825. The circuits 823 and 825 are similar in structure and operation. The error voltage from the amplifier 811 is applied through the resistor 821 to a source (S) electrode of a FET 827 in each of the circuits 823 and 825. The drain (D) electrode of the FET 827 is applied to the non-inverting input of an operational amplifier 829 and to a capacitor 831 which has its other terminal grounded. The output of the amplifier 829 is coupled to the inverting input and through a resistor 833 to the gate electrode 827 and to the anode of a diode 835. The $X_f$ and $Y_f$ signals from the program authorization unit 115 are respectively applied to the diodes 835 in the circuits 823 and 825 to selectively enable these circuits to receive the error voltage from the amplifier 811 and to therefore selectively develop the channel X and channel Y error signals.

When the $X_f$ signal is in a 1 state, it back-biases the diode 835 in the circuit 823, which allows the output of the amplifier 829 in the circuit 823 to be applied back through the resistor 833 to the gate electrode of the FET 827 to enable the potential on its gate electrode to rise to the potential of the source and drain electrodes, thereby turning on the FET 827 in the circuit 823. When this FET 827 is turned on by the 1 state $X_f$ signal, the associated capacitor 831 is allowed to charge or discharge to a potential equal to the voltage at its source electrode, which is substantially equal to the differential error signal at the output of the associated amplifier 811 at that time. As a result, the channel X sample and hold circuit 823 samples the channel X error signal during the time that a 1 state $X_f$ signal is applied thereto. This channel X error signal is applied from the output of the amplifier 829 of the circuit 823 to the channel frequency select and switching circuit 121 to enable the circuit 121 to develop the proper X tuning voltage for the operation of the converter 97 during the time that the desired program is on channel X.

When the $X_f$ signal is in a 0 state condition it passes through the diode 835 in the circuit 823 and disables or turns "off" the associated FET 827 by placing the gate electrode of the FET 827 at a negative potential with respect to its source and drain electrodes. As a result, the channel X sample and hold circuit 823 does not sample the error voltage from the output of the amplifier 811 when the $X_f$ signal is in the 0 state.

The operation of the channel Y sample and hold circuit 825 is identical to that of the channel X sample and hold circuit 823 except that it utilizes the $Y_f$ input to develop the channel Y error signal. As described previously, when $X_f$ is in a 0 state condition, $Y_f$ is in a 1 state condition, and vice versa. As a result, when the channel X error signal is being sampled ($X_f$=1) and the channel Y error signal is being held ($Y_f$=0) and vice versa. Like the channel X error signal, the channel Y error signal is also applied to the circuit 121 to enable the circuit 121 to develop the proper Y tuning voltage for the operation of the converter 97 during the time that the desired program is on channel Y.

Figure 27:
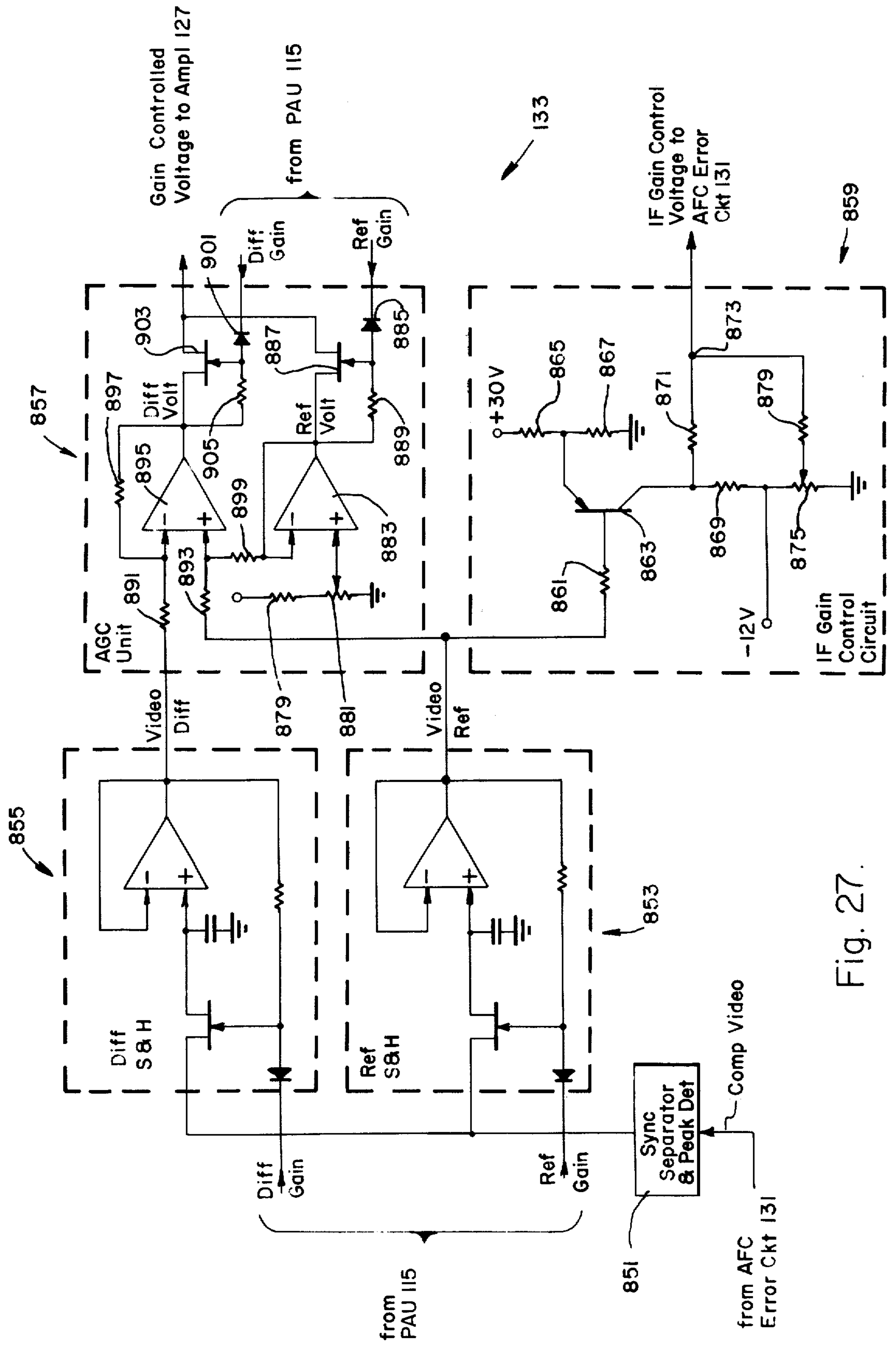
FIG. 27 illustrates a block diagram of the automatic gain control (AGC) circuit of FIG. 4.

The AGC circuit 133 to which the composite video from the AFC error circuit 131 was applied, will now be discussed in more detail by referring to FIG. 27. It should be recalled that in the discussion of the AFC error circuit of FIG. 26, it was specified that the IF gain control signal from the AGC circuit 133 was operationally stabilized at such a voltage level that it would cause the AFc error circuit 131 to develop the composite video signal at a voltage level of approximately 6 to 8 volts peak-to-peak. This composite video signal from the video IF amplifier and detector 805 in the AFC error circuit 131 is applied to a sync separator and peak detector 851, which develops an output voltage that is proportional to the amplitude of the horizontal and vertical sync pulses contained in the composite video. The output of the sync separator and detector circuit 851 is applied to a reference sample and hold circuit 853 and to a difference sample and hold circuit 855. The reference (ref.) gain and difference (diff.) gain signals from the program authorization unit 115 are also respectively applied to the circuits 853 and 855. The operation and structure of each of the sample and hold circuits 853 and 855 are identical with the sample and hold circuits 823 and 825 discussed in FIG. 26. As a result, no detailed explanation of the operation of these circuits 853 and 855 is required.

It will now be explained how the IF gain control voltage that is applied to the video IF amplifier and detector 805 is developed in non-scrambling and scrambling modes of operation.

By referring back to the program authorization unit of FIG. 24, it can be seen that the output of the AND gate 701 is in a 0 state whenever no unscrambling is being initiated. This could be due to the fact that the desired program is not being scrambled, or is being scrambled but not paid for. It should be recalled that the reference gain signal will be in a 1 state condition and the difference gain signal will be in a 0 state condition, when the AND gate 701 is in a 0 state condition. Returning now to FIG. 27, the 1 state reference gain signal will cause a video reference voltage to be developed by the circuit 853 in a manner similar to that described in relation to the circuit 823 of FIG. 26. This video reference signal is applied to an AGC unit 857 and to an IF gain control circuit 859. It is the IF gain control circuit 859 which develops the IF gain control voltage being applied to the video IF amplifier and detector 805. Consequently, the circuit 859 will be discussed at this time.

The video reference signal from the circuit 853 is applied through a resistor 861 to the base of a PNP transistor 863. The emitter of the transistor 863 is coupled to the junction of two serially connected resistors 865 and 867 which have their opposite ends respectively coupled between a +30 volt xource and ground. The collector of the transistor 863 is coupled through a resistor 869 to a −12 volt source. The IF gain control circuit 859 is configured to operate as an inverting amplifier, with the output from the transistor 863 being applied from the collector through a resistor 871 to a junction point 873 from which the IF gain control voltage is taken. The movable arm of a potentiometer 875, which is coupled between a −12 volt source and ground, establishes a reference voltage level which is applied through a resistor 877 to the junction point 873. The video reference signal is inverted and amplified by the transistor 863 before it is applied to the junction point 873. The reference voltage established by the movable arm of the potentiometer 875 sets the initial level of the video reference voltage by summing, at the junction point 873, the voltage tapped off of the arm of the potentiometer 875 with the signal at the collector of the transistor 863. In this manner the IF gain control voltage varies around the reference level established by the position of the movable arm of the potentiometer 875.

In operation, if the composite video level decreases, the video reference level will decrease, thereby increasing the level of the IF gain control voltage to force the video IF amplifier and detector 805 (FIG. 26) to increase the amplitude of the composite video signal that is applied to the circuit 851. This causes the video reference voltage level to increase and thereby stabilize the loop at some fixed voltage level.

In the unscrambling mode of operation, this loop remains operational even during the unscrambling operation. However, the sampling rate of the circuit 853 is lower since the system will alternately sample back and forth between the circuits 853 and 855. This is due to the fact that the reference and difference gain signals are alternately changing their binary states. When the reference gain signal is in a 1 state the circuit 853 samples the output of the sync separator and peak detector circuit 851 and when the difference gain signal is in a 1 state the circuit 855 samples the output of the circuit 851. The binary states of the reference gain and difference gain signals are selectively determined by the switching signal that is applied from the decoder 113 to the program authorization unit 115. The reference sample and hold circuit 853 will still be required to develop the video reference signal, even at a lower sampling rate, in order to cause the IF gain control circuit 859 to maintain a fixed IF gain control voltage which fixes the gain of the video IF amplifier and detector 805 independent of whether channel X or channel Y is being selected.

Another operational requirement of the unscrambling mode of operation for the system, besides stabilizing the frequency of the video carrier presented to the TV set 129, is that the amplitude of the video carrier presented to the TV set 129 must be stabilized. Also, when switching signal from the decoder 113 (FIG. 22) is in a 1 state during this mode of operation, the polarity of the difference gain and reference gain signals will be such that the reference gain signal will also be in a 1 state to enable the reference sample and hold circuit 853 to sample the output of the circuit 851, while the circuit 855 will be holding its previous value. In a like manner, when the switching signal is in a 0 state condition the difference gain signal is in a 1 state and the reference gain is in a 0 state. At this time the circuit 855 is selected to perform its sampling while the circuit 853 is holding its previous value. As a result of this independent sampling and holding of the video level when channel X is selected and the video level when channel Y is selected, the difference between the video difference and video reference voltages is proportional to the difference between the signal strengths of the two video carrier frequencies of the X and Y scrambled channels.

Any voltage difference between the video difference and video reference signals will be corrected through the operation of the AGC unit 857, to which these signals are being applied. As a result, the operation of the AGC unit 857 will now be explained. A resistor 879 is serially coupled to a potentiometer 881 with the opposite ends of the resistor 879 and potentiometer 881 being respectively coupled between a positive voltage source and ground. The movable arm of the potentiometer 881 is coupled to the non-inverting input of an operational amplifier 883 configured to operate as a voltage follower. The inverting input of the amplifier 883 is coupled to the output of the amplifier 883 to enable the amplifier 883 to develop a "reference (ref.) voltage" which is determined by the setting of the potentiometer 881. When the reference gain signal is in a 1 state condition a diode 885 is reverse-biased to enable a FET 887 to pass the reference voltage from the amplifier 883 to the gain control amplifier 127. This reference voltage is adjusted to an optimum gain control setting for the amplifier 127. A pull-up resistor 889 is coupled between the gate electrode of the FET 887 and the output of the amplifier 883. The operation of the FET 887 is similar to the operation of the FET 769 discussed in FIG. 25, and therefore will not have to be reexplained.

The video difference and video reference signals from the circuits 855 and 853 are respectively applied through resistors 891 and 893 to the inverting and non-inverting inputs of a differential amplifier 895. A feedback resistor 897 is coupled between the output and inverting inputs of the differential amplifier 895. The reference voltage developed at the output of the amplifier 883 is applied through a resistor 899 to the non-inverting input of the differential amplifier 895. The amplifier 895 and resistors 897, 899, 891 and 893 form a differential amplifier circuit similar in structure and operation to the differential amplifier comprised of the amplifier 811 and resistors 813, 819, 809 and 807 in the AFC error circuit 131 (FIG. 26). The output of this differential amplifier 895 is a "difference (diff.) voltage" which is proportional to the difference between the video difference and video reference voltages and offset by the amplitude of the reference voltage. As a result, if the video difference voltage is more positive in potential than the video reference voltage, the difference voltage at the output of the differential amplifier 895 will be less positive than the reference voltage at the output of the amplifier 883, and vice versa.

When the difference gain signal from the program authorization unit 115 is in a 1 state condition, it backbiases a diode 901, whose anode is coupled to the gate electrode of a FET 903. A resistor 905 is coupled between this gate electrode and the output of the differential amplifier 895 to assure the proper operation of the FET 903. The operation of the FET 903 is similar to that of the FET 887. The back-biasing of the diode 901 enables the FET 903 to apply the difference voltage, developed at the output of the differential amplifier 895, as the gain controlled voltage to the amplifier 127. Any amplitude difference between the difference and reference voltages will force the output voltage level of the gain controlled amplifier 127, and hence the voltage level of the composite video signal, to change in such a direction so as to null out the difference between the video difference and video reference voltages, as the AGC circuit 133 is being switched between the difference gain and reference gain signals. The output level of the gain controlled amplifier 127 is changing as the difference gain and reference gain signals are being switched in order to assure that the video difference and video reference signals are substantially equal to each other. As a result of this AGC action, the signal level of the video carrier frequency at the output of the amplifier 127, which goes to the TV set 129, as well as to the AFC error circuit 131, remains constant as the system is switched between channels S and Y in the unscrambling operation.

The invention thus provides a system wherein at least two television programs are intermittently and selectively switched between two transmission channels so that the output of either transmission channel comprises a sequence of alternate television signals from the two television programs. At the same time that the two television programs are switched between the two transmission channels, or shortly before, a coded signal is transmitted to each of the subscriber terminals in the system to enable authorized subscribers to receive a selected channel in which the scrambled program is unscrambled. Upon being authorized by the payment of a fee or a specific action (e.g., actuation of a pushbutton, key switch and similar instruments) indicating a willingness to pay a fee, a subscriber is allowed to receive a desired program in an unscrambled state by unscrambling circuitry which switch between the input transmission channels at substantially the same time that the programs are being switched between the transmission channels.

While the salient features have been illustrated and described, it should be readily apparent to those skilled in the art that modifications can be made within the spirit and scope of the invention. For example, the system could be mechanized such that only one channel contains an intelligible program. The second channel could contain a distracting or extremely annoying signal to further disrupt the intelligibility of the desired television program. It should also be realized that the program duration herein described can range from conventional television programming lasting seconds, minutes or longer to program material which will last for the duration of a television field or frame. The second channel could also contain high-pitched sound as well as moving disruptive patterns. Although the invention was shown and described in relation to a pair of adjacent channels, it should be obvious that the system could operate with more than one pair of programs and with more than two channels in each switching group or with nonadjacent channels. While it is easier to mechanize the system when the channels are adjacent, there is no requirement within the purview of this invention which makes it mandatory that the two channels be adjacent. The system has also been described in relation to scrambling television signals. However, it could be used in a voice link or any other type of communications link where the scrambled reception by unauthorized persons would be desirable. It is therefore intended that the scope of the invention be only limited by the claim limitations as set forth in the appended claims.

What is claimed is:

1. A subscription television scrambling and unscrambling system for selectively transmitting a plurality of television programs on a plurality of transmission channels from a central station to each of a plurality of subscriber sites; said system comprising:

central station equipment comprising:

first means for deriving a first signal from a first television program signal;

second means for deriving timing signals from a second television program signal;

third means coupled to said first and second means for developing a channel switching code in response to the first signal and timing signals;

fourth means coupled to said third means for enabling the channel switching code to be transmitted to the subscriber sites in the system;

fifth means having first and second output circuits, said fifth means being coupled to said fourth means for selectively alternating the first and second television program signals between said first and second output circuits at preselected times determined by a sequence of channel switching codes in order to respectively develop third and fourth scrambled television program signals at said first and second output circuits;

first and second transmitting means respectively coupled to said first and second output circuits for transmitting to each of the subscriber sites the third and fourth television program signals within the first and second transmission channels, respectively; and equipment at each subscriber site comprising:

a frequency converter responsive to the plurality of transmission channels for converting any selected transmission channel to a predesignated transmission channel;

sixth means for developing signal information in response to each channel switching code received from the central station;

seventh means coupled to said sixth means for utilizing the signal information therefrom to generate first and second switching signals when a subscriber is authorized to receive a scrambled television program on a transmission channel selected by the subscriber; and switching means coupled between said seventh means and said frequency converter for selectively developing and applying first and second tuning voltages to said frequency converter in response to said first and second switching signals, said frequency converter being responsive to the selective application of the first and second tuning voltages for causing the desired one of the first and second television programs to be developed within the predesignated transmission channel.

2. The system of claim 1 further including:

an automatic frequency control error circuit, coupled to said seventh means, being selectively responsive to the first and second switching signals and to desired program signals in the predesignated transmission channel for selectively generating and applying first and second error frequency signals to said switching means to modify the first and second tuning voltages, the modified first and second tuning voltages operating to precisely control the frequency of the predesignated transmission channel.

3. The system of claim 2 wherein:

said seventh means is responsive to the signal information for also generating second and third signals; and said frequency converter includes a gain controlled voltage amplifier; said system further including:

an automatic gain control circuit, coupled between said seventh means and said amplifier, being responsive to signals from said seventh means and to a video signal from said error circuit for developing and applying a control signal to control the voltage level of the signals from said voltage amplifier as said converter is alternately switching between the first and second transmission channels.

4. A subscription television scrambling and unscrambling system comprising:

first means for selectively alternating two television program signals between two television channels;

second means for deriving first and second composite video signals from the intermediate frequencies of the first and second program signals to be scrambled;

first and second logic means for respectively developing a first signal and a plurality of timing signals from the first and second composite video signals;

third means coupled to said first and second logic means being responsive to the first signal and the plurality of timing signals for generating a channel switching code containing information related program scrambling;

fourth means coupled to said third means for transmitting the channel switching code to the subscriber;

fifth means responsive to the code and to a subscriber input for generating a first signal as long as the subscriber is authorized to receive an unscrambled one of the two programs; and sixth means being responsive to the two television channels, the code and to the first signal for selectively alternating the previously alternated television programs between the two television channels to permit the unscrambled reception of the selected television program by the subscriber.

5. A subscription television scrambling and unscrambling system comprising:

first means for selectively alternating two television programs between two television channels;

second means for transmitting a code for each time that the two television programs are alternated between the two television channels;

third means for receiving each code transmitted by said second means;

fourth means coupled to said third means for developing signal information from each code transmitted from said second means;

fifth means for generating a select code to identify the television channel that a subscriber has selected;

sixth means for developing a code signal to indicate that a subscriber desired to receive a particular television program;

seventh means coupled to said fifth means and to said sixth means for selectively utilizing the signal information, the select code and the code signal to generate an unscrambled signal when the subscriber is authorized to receive the particular program;

eighth means coupled to said seventh means for generating the first signal; and ninth means being responsive to the two television channels, the code and to the first signal for selectively alternating the previously alternated television programs between the two television channels to permit the unscrambled reception of the selected television program by the subscriber.

6. The system of claim 5 wherein said second means includes:

means for deriving first and second composite video signals from the intermediate frequencies of the first and second program signals to be scrambled;

first and second logic means for respectively developing a first signal and a plurality of timing signals from the first and second composite video signals;

tenth means coupled to said first and second logic means being responsive to the first signal and the plurality of timing signals for generating a channel switching code containing information related program scrambling; and a transmitter coupled to said tenth means for transmitting the channel switching code to the subscribers.

7. The system of claim 6 wherein said first means includes:

first and second transmission channels for transmitting signals applied thereto at their radio frequencies;

eleventh means, coupled to said first and second transmission channels, being responsive to the application of first and second television program signals at their baseband frequencies for selectively alternating the first and second program signals between said first and second transmission channels at preselected times.

8. The system of claim 6 wherein said first means includes:

first and second converters for respectively receiving first and second program signals at their intermediate frequencies;

first and second oscillators for respectively developing first and second oscillator signals; and means selectively coupled to said first and second converters and to said first and second oscillators for alternately switching the first and second oscillator signals between said first and second converters at preselected times to develop first and second output scrambled programs.

9. The system of claim 6 wherein said first means includes:

first and second oscillators for respectively developing first and second oscillator signals;

first and second converters respectively coupled to said first and second oscillators; and switching means coupled to said first and second converters being responsive to first and second intermediate frequency television program signals for causing said first and second converters to respectively develop first and second scrambled radio frequency program signals.

10. The system of claim 6 wherein said first means includes:

first and second oscillators for respectively developing first and second oscillator signals;

first and second converters respectively coupled to said first and second oscillators;

twelfth means for developing a first signal at preselected times; and a first circuit coupled to said first and second converters and to said twelfth means, said first circuit being responsive to first and second program signals at their intermediate frequencies for alternately switching the first and second program signals between said first and second converters each time that a first signal is developed, said first and second converters being respectively responsive to the first and second oscillator signals and to correspondingly alternated sequences of first and second program signals for respectively developing first and second scrambled radio frequency program signals in first and second transmission channels.

11. The system of claim 10 wherein said ninth means includes:

a frequency converter responsive to the two television channels for converting a selected transmission channel signal to a predesignated transmission channel signal;

selected channel switching means, coupled to said eighth means and to said fifth means, being selectively responsive to the first signal and to the select code for selectively applying first and second tuning voltages to said frequency converter to cause the selected one of the two television programs to appear in an unscrambled condition at the output of said converter.

12. The system of claim 5 wherein said ninth means includes:

a frequency converter responsive to the two television channels for converting a selected transmission channel signal to a predesignated transmission channel signal;

selected channel switching means, coupled to said eighth means and to said fifth means, being selectively responsive to the first signal and to the select code for selectively applying first and second tuning voltages to said frequency converter to cause the selected one of the two television programs to appear in an unscrambled condition at the output of said converter.

* * * * *